(12) United States Patent
Smith et al.

(10) Patent No.: US 7,138,462 B2
(45) Date of Patent: Nov. 21, 2006

(54) FUNCTIONALIZED POLYMERS FOR BINDING TO SOLUTES IN AQUEOUS SOLUTIONS

(75) Inventors: Barbara F. Smith, Los Alamos, NM (US); Thomas W. Robison, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 179 days.

(21) Appl. No.: 10/646,378

(22) Filed: Aug. 22, 2003

(65) Prior Publication Data

US 2005/0043493 A1 Feb. 24, 2005

(51) Int. Cl.
*C08F 22/36* (2006.01)
(52) U.S. Cl. ............... 525/328.4; 525/328.2; 525/329.4; 525/329.7; 525/329.8; 525/329.9; 525/340; 525/343; 525/384
(58) Field of Classification Search ............. 525/328.2, 525/328.4, 329.4, 329.7, 329.8, 329.9, 340, 525/343, 384
See application file for complete search history.

(56) References Cited

U.S. PATENT DOCUMENTS

| | | | |
|---|---|---|---|
| 4,867,951 A | 9/1989 | Smith et al. | |
| 4,923,630 A | 5/1990 | Smith et al. | |
| 5,262,024 A | 11/1993 | Lomasney et al. | |
| 5,409,678 A | 4/1995 | Smith et al. | |
| 5,419,877 A | 5/1995 | Goforth et al. | |
| 5,643,456 A | 7/1997 | Smith et al. | |
| 5,726,267 A * | 3/1998 | Howland et al. | 526/304 |
| 5,766,478 A | 6/1998 | Smith et al. | |
| 5,824,210 A | 10/1998 | Kuryluk | |
| 5,891,956 A | 4/1999 | Smith et al. | |
| 5,928,517 A | 7/1999 | Smith et al. | |
| 5,984,578 A | 11/1999 | Hanesian et al. | |
| 6,017,994 A * | 1/2000 | Carter et al. | 524/555 |
| 6,082,548 A | 7/2000 | Stephenson et al. | |

FOREIGN PATENT DOCUMENTS

| | | | |
|---|---|---|---|
| GB | 2360525 A | * | 9/2001 |
| WO | WO 99/22933 | * | 5/1999 |

OTHER PUBLICATIONS

Shubha et al. Water Research (2000), 35(1), 300-310.*

Cobianco et al. Reactive & Functional Polymers (2000), 43(1,2), 7-16.*
Rivas et al. Angewandte Makromolekulare Chemie (1993), 211, 103-12.□□*
Kawamura et al. Ind. Eng. Chem. Res. 1993, 32, 386-391.*
Barbara F. Smith, "Removal and Stabilization of Mercury From Mixed Waste Debris Using Polymer Filtration Technology," pp. 1-2, May 1, 2002, www.newmoa.org/Newmoa/htdocs/prevention/mercury/breakingcycle/compeduium/Bsmith.doc.
Barbara F. Smith et al., "Polyelectrolyte Enhanced Removal of Metals From Soils and Other Solids," Technomic Publishing Co., Lancaster, Pennsylvania, pp. 1-73, Sep. 26, 2001.
C.M. Barnes et al., "Technology Evaluations Related to Mercury, Technetium, and Chloride in Treatment of Wastes at the Idaho Nuclear Technology and Engineering Center of the Idaho National Engineering and Environment Laboratory,", Idaho National Engineering and Environmental Laboratory High-Level Waste Program, Idaho Falls, pp. 1-286, Oct. 1999.
Barbara F. Smith et al., "Polyelectrolyte Enhanced Removal of Mercury From Mixed Waste Debris," WM99 Conference, pp. 1-19, Feb. 28-Mar. 4, 1999.
Barbara F. Smith, "Synthesis of New Water-Soluble Metal-Binding Polymers: Combinatorial Chemistry Approach," Mid-Year Progress Report, pp. 1-9, Jun. 1, 1997.
Barbara F. Smith et al., "Selective Removal/Recovery of RCRA Metals from Waste and Process Solutions Using Polymer Filtration Technology," Proceedings of the Efficient Separations and Processing Crosscutting Program 1997 Technical Exchange Meeting, Gaithersburg, Maryland, Jan. 28-30, pp. 1-34, 1997.
Barbara F. Smith et al., "Polymer Filtration: A New Technology for Selective Metals Recovery," Surface Finishing, American Electroplate and Surface Finishers Society, Inc. Baltimore, MD, pp. 1-10, Jun. 25-28, 1995.
Barbara Smith et al., "Chelating Water-Soluble Polymers for Waste Minimization," pp. 1-15, (Applicants are unable to determine the exact publication date of this paper, however it is believed to be publicly available as of late 1997).

* cited by examiner

*Primary Examiner*—Helen L. Pezzuto
(74) *Attorney, Agent, or Firm*—Robert P. Santandrea

(57) ABSTRACT

A functionalized polymer for binding a dissolved molecule in an aqueous solution is presented. The polymer has a backbone polymer to which one or more functional groups are covalently linked. The backbone polymer can be such polymers as polyethylenimine, polyvinylamine, polyallylamine, and polypropylamine. These polymers are generally water-soluble, but can be insoluble when cross-linked. The functional group can be for example diol derivatives, polyol derivatives, thiol and dithiol derivatives, guest-host groups, affinity groups, beta-diphosphonic acids, and beta-diamides

43 Claims, 8 Drawing Sheets

FUNCTIONALIZED POLYMERS FOR BINDING TO SOLUTES IN AQUEOUS SOLUTIONS

GOVERNMENTS RIGHTS

This invention was made with Government support under Contract No. W-7405-ENG-36 awarded by the United States Department of Energy to The Regents of the University of California. The Government has certain rights in the invention.

BACKGROUND OF THE INVENTION

1. The Field of the Invention

The present invention relates to synthetic water-soluble polymers. More specifically, the present invention relates to water-soluble polymers and crosslinked water-soluble polymers that can be used with methods of selectively removing solutes from a solution.

2. Technical Background

Many solutes are found dissolved in water. Whether the water is a naturally occurring body of water such as lake, stream, river, aquifer, or ocean or a man made body such as process solution sumps, microorganism broths, a mine slag pond, power plant waters, or a municipal waste pond, the water contains dissolved solutes. Some of these solutes are impurities and contaminants that pose a hazard to the environment. Other dissolved solutes may not present a significant health hazard, but affect the taste and quality of culinary water. Yet other dissolved solutes have a significant economic value, which would encourage one to recover the solutes from the solution. The solutes can be of an organic or inorganic nature such as metal cations (for example, $Cu^{2+}$), metal oxyanions (for example, $AgS_2O_3^{-1}$), nonmetal small molecules (for example, $Si(OH)_4$), or organic small molecules (for example, pyridine).

In the environment, rivers, lakes, and ground water are frequently contaminated with hazardous dissolved molecules. These contaminants may come from naturally occurring deposits. However, frequently the contaminants originate in waste streams from industrial sites and investigative laboratories. Other man-made sources of water contamination include abandoned mining operations, solid waste disposal facilities, power plant waters, and municipal waste disposal facilities. For the quality of the water in the environment to be improved, the contaminants need to be removed from a waste stream before the stream is discharged into the environment.

Contaminant solutes such as arsenic, barium, cadmium, chromium, mercury, lead, silver, and selenium are pollutants that are regulated by the Resource Conservation and Recovery Act (RCRA). Because these pollutants are covered by RCRA, strict regulations have been created that restrict the amount of these pollutants that may be discharged into the environment or are allowed in drinking water from natural sources. Moreover, the ability of industry to dispose of waste containing these pollutants is greatly limited. Because of these regulations, there is a great need to be able to remove these solutes from aqueous streams.

A variety of methods have been developed for the removal of RCRA pollutants. These methods frequently use harsh chemicals to precipitate the pollutant from the water. Such chemicals can themselves present a hazard to the technicians employing the method and frequently present additional waste disposal issues. Moreover, the reagents and conditions required for such removal methods can be very expensive. In fact the cost of many clean-up operations is the single biggest obstacle to rapid and effective clean-up of contaminated sites. Cost and effectiveness is a major obstacle to process stream treatment.

Recently, Polymer Filtration technology has been developed for removing such metallic contaminants from water. Generally, Polymer Filtration uses a water-soluble solute-binding polymer to bind the target solute contaminant in water. The solution is then ultrafiltered to concentrate the polymer/solute complex, thus separating the target solute from the bulk of the aqueous solution and purifying the solute from other low-binding components in the solution. The polymer contains oxygen, nitrogen, or sulfur groups, which bind to and form a complex with the solute in solution. The soluble polymers might form a guest-host interaction as its form of complex formation. After the complex is formed, the solution is filtered through an ultrafiltration membrane. The ultrafiltration membrane has a molecular weight cutoff (MWCO) value that is selected to retain the water-soluble polymer and any polymer-solute complex while allowing the water and other dissolved molecules to pass through. This filtration creates a concentrated solution of the polymer/solute complex, which can be more easily treated.

Polymer Filtration technology (PF) has many advantages over other methods of removing solutes from aqueous streams. The major advantage of PF is that the binding of the solute occurs in a homogenous environment, which gives rapid kinetics of binding and can translate into a relatively economical process. The solutes can generally be stripped from the soluble polymer allowing the polymer to be recycled for additional rounds of solute binding. The recycling of the polymer significantly reduces the cost of the removal process because the reagents may be used multiple times. Moreover, because the polymer is recycled, less secondary waste is created, which reduces or eliminates disposal issues. The soluble polymers are generally harmless to the environment, which allows the method to be used at sites of large scale contamination. Polymer Filtration also works with dilute solutions at a variety of temperatures thereby eliminating the need for closely controlled reaction conditions.

Pollutants are not the only solutes dissolved in solutions. Frequently, valuable metal ions may be found in dilute solutions. Because the cost of recovery of metal ions is very high, it is often not economically feasible to recover the metals from solution. Thus, a large amount of potentially valuable materials are lost to aqueous stream. Other solutes such as boric acid and silicic acid are frequently found in solutions. Other dissolved solutes may include inorganic acids and bases as well as organic molecules. Polymer Filtration may be useful to recover or remove these solutes if selective water-soluble polymers were available to bind them.

Other solutes that can contaminate waste streams are acids, bases, and neutral organic molecules. Such acids may be organic acids including diethylenetriaminepentaacetic acid (DTPA), nitrilotriacetic acid (NTA), imidodiacetic acid (IDA), and ethylenediaminetetraacetic acid (EDTA). Nonmetallic, inorganic acid contaminants may include phosphorus acid, phosphoric acid, boric acid, silicic acid, arsenous acid, arsenic acid, silicic acid, and selenic acid. Bases may include ammonia, and organic amines such as pyridine, methylamine, and dimethylamine. Neutral contaminants include alcohols, aldehydes, nitrites, and amides as examples. Polymer Filtration may be useful to recover these solutes and other solutes of value if soluble polymers were available to bind them.

There may be situations where small molecules have contaminated a surface such as in a radiological contamination or toxic organic chemicals contamination. An aqueous solution of the water-soluble polymer could be used to clean, decontaminate, or deactivate the material from the surface. Or there might be solids that are composed of valuable materials where it might be desirable to leach the valuables from the solid. In these cases the small molecules or ions are extracted into the aqueous solution and bound by the water-soluble polymer and then the solute-polymer complex can be concentrated using ultrafiltration. The solute could be recovered from the polymer in concentrated form and the soluble polymer reused for further cleaning. Or if the soluble-polymers are deactivating the toxic or hazardous contaminate, it might be more desirable to not reuse the polymer, but just stabilize the concentrate.

Other aqueous solutions may contain dissolved solutes that need to be recovered. Such aqueous solutions may be reaction solutions in which useful compounds are synthesized. Such small molecules may include drugs, food additives, pesticides, pharmaceuticals, and the like. Frequently these chemicals are produced in low yield solutions with other reaction products. Therefore, the compound must be concentrated and purified before it can be used for its intended purpose. Such purification methods may be expensive and slow. Also, the purification method itself may create additional byproducts that must be destroyed or otherwise disposed of.

Other useful solutes are produced in aqueous solutions such as growth media from a bioreactor or serum, blood, urine or other bodily fluids from an animal. These small molecules can include polypeptides, nucleic acids, antibodies, drugs, and the like. Like chemically synthesized small molecules, these molecules must be concentrated and purified prior to use. The currently available purification methods for these types of small molecules can be very expensive. Additionally, purification methods frequently use harsh chemicals and conditions, which may result in damage to the useful small molecule or to the bioreactor components. Furthermore some methods of purification are not able to selectively distinguish between a desired product and an unwanted byproduct or other contaminant. Polymer Filtration may be useful to recover these solutes if polymers were available to bind them.

Other aqueous streams that contain solutes requiring recovery or removal are radioactive process streams that come from actinide reprocessing, nuclear power coolant waters, nuclear power reactor wastes, coal power plant waste-waters, and other operations that product waters containing radioactive solutes. The solutes can consist of species such as uranium, plutonium, americium, neptunium, curium, thorium, technetium, radioactive active cobalt, silver, antimony, iodine, and other potential activation products.

There may be some situations where Polymer Filtration technology cannot be incorporated into a separations process. There may be cases where the same solute selectivity that was developed for the soluble polymers is needed in an insoluble form. Then the soluble polymer can be in a crosslinked form and used as a solid gel or resin. Though the solute selectivity may be retained, the rapid kinetics of a homogenous binding system would likely be lost as a two-phase system (water and solid polymer) is established. Cross-linking agents can include a variety of bifunctional agents such as dihalogen alkanes (e.g., 1,2-dibromoethane), dialdehydes (e.g., gluteraldehyde), dienes (e.g., 1,3-butandiene), diepoxides (e.g., diglycidol) and the like. Other modes of crosslinking can include radiation treatment producing radicals that allow the large soluble molecules to bind together forming insoluble polymers.

In light of the foregoing, it would be an advancement in the art to provide new functionalized polymers for use in removal of solutes from water through Polymer Filtration methods. It would be an additional advancement if the polymers had functional groups capable of binding solutes at varying pH levels. A functionalized polymer that could bind RCRA metal ions such as arsenic, barium, cadmium, chromium, mercury, lead, silver, and selenium, and other metal ions such as actinides, fission and activation products, and transition metals would provide significant advancements in clean-up of water contamination. A functionalized polymer that could bind other solutes such as boric acid, silicic acid, organic molecules, and inorganic acids and bases would be a further advancement. An additional advancement would be achieved if the functionalized polymer were able to bind to valuable molecules in dilute solutions. It would be a further advancement to provide polymers capable of binding to anionic solutes or cationic solutes. It would be a further advancement to provide functionalized polymers, which could bind solutes by an interaction other than ionic bonding.

BRIEF SUMMARY OF THE INVENTION

The present invention relates to functionalized polymers that can be used to bind to solutes dissolved in a solution. In general, a functionalized polymer of the present invention has a preformed polymeric backbone. The polymeric backbone can be one of many synthetic water-soluble polymers known in the art. For example the polymer may be PEI (polyethylenimine), PVA (polyvinylamine), PAA (polyallylamine), polyacrylamide, polyacrylic acid, polymethacrylic acid, or the like that have atoms such as nitrogen and oxygen that can easily undergo functional group attachment. One or more functional groups is covalently linked to the polymer. The functional group can be selected for its ability to bind to a particular solute or suite of solutes. Such binding groups may be diol derivatives, triol derivatives, tetraol derivatives, thiol and dithiol derivatives, guest-host groups, affinity groups, bisphosphonic acids, bisamides, and the like.

One example of a diol derivative is the addition of tartrate to the backbone polymer. Tartrate is a four-carbon molecule having the structure shown in Formula 1 where R can be H or an alkyl group such as ethyl. When tartrate is covalently linked to a polymeric backbone at an amine site at least three possible configurations are possible. The carboxylate of the tartrate may form a cyclic tartrate imide, an open monoester, or may from a diamide attached to two different nitrogens within the polymeric backbone. The open ester can then be hydrolyzed to give the monotartaric acid attached as a single amide to the polymeric backbone.

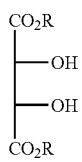

Formula 1

The functionalized polymer may be either water-soluble or water-insoluble. Water-soluble polymers can be useful in separating solutes from the solution by a process of ultrafiltration. Insoluble polymers may be used as a gel coating or beads. Such resins or beads can bind the solute in the solution allowing the solute to be recovered from the solution. A water-soluble polymer may be rendered insoluble by crosslinking the soluble polymer. Moreover, the polymeric backbone may be initially insoluble before the one or more functional groups are covalently attached to the backbone.

When the functionalized polymer is used for ultrafiltration, it may be useful to purify the polymer to the particular molecular weight cutoff (MWCO) of the ultrafiltration membrane. Such purification can select functionalized polymers having molecular sizes capable of being retained by a membrane with a molecular weight cutoff value of a first preselected level and essentially free of polymer molecule sizes capable of passing through a membrane with a molecular weight cutoff value of a second preselected level, the second preselected level being smaller than the first preselected level. Water-soluble functionalized polymers having a molecular weight in the range from about 1,000 to about 1,000,000 may be used for ultrafiltration removal of dissolved molecules. Functionalized polymers having a molecular weight in the range from about 10,000 to about 100,000 may also be useful.

The functionalized polymers of the present invention may be represented by the following formula: X—R. "X" represents the polymeric backbone of the polymer. The polymeric backbone may be such polymers as PEI, PVA, PAA, polypropylamine, polyacrylamide, polyvinylalcohol, or polyacrylic acid. "R" represents a functional group that is covalently linked to the polymeric backbone. Such functional groups can include of a monool, a diol, a triol, a tetraol, glucarone, and a dithiol derivative. Examples of such functionalized polymers are represented by the following Formulas 2–8 where X represents a polymeric backbone.

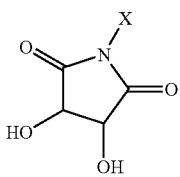

Formula 2

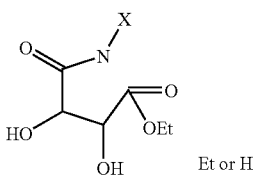

Formula 3

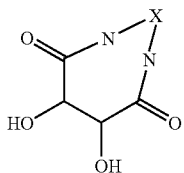

Formula 4

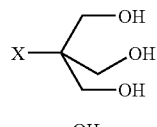

Formula 5

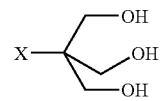

Formula 6

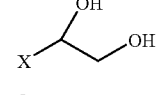

Formula 7

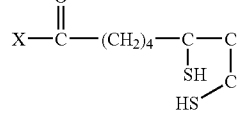

Formula 8

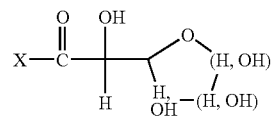

A number of solutes may be bound by the functionalized polymers of the present invention. Such solutes can be metal ions such as RCRA metals, actinides, lanthanides, and transition metals such as cobalt, copper, nickel, and zinc. Non-metallic acidic molecules containing boron, silicon, and antimony, may also be bound by the functionalized-polymer. The functional group may form an ionic bond with the dissolved molecule thereby allowing the molecule to be removed from the solution. However, a functionalized polymer containing a diol or thiol functional group may bind the solute via an ester or thioester formation interaction. Other functional groups form a cage or inclusion guest-host interactions where the solute selectively fits into a cavity such as pyridine into a beta-cyclodextran functional group. Or for some of the polymers the binding mechanism may be mixtures of mechanisms. No matter the mechanism of solute binding, the polymers are designed to separate solutes form solutions either selectively, as a suite of solutes, or to remove very low levels of the solute from the solution.

Some functionalized polymers of the present invention may be characterized by the following formula:

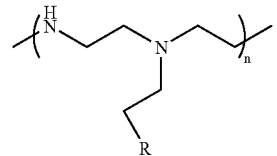

Formula 9

In these embodiments, n is an integer from about 12 to about 12,000. R is often $NH_2$ with a functional group attached. At these positions, R may be independently selected from a tartrate derivative, a monool, a diol, a triol, a tetraol, glucarone, an alphyhydroxycarboxylate, and a dithiol. Polymers of this formula may be either soluble or insoluble with the insoluble polymers being insoluble because of crosslinking within the polymeric backbone. These soluble polymers may be purified as discussed above to have a molecular weight and size, which is retained by a membrane with a molecular weight cutoff value of a first pre-selected level and essentially free of polymer molecule sizes capable of passing through a membrane with a molecular weight cutoff value of a second pre-selected level, the second pre-selected level being smaller than the first pre-selected level. These polymers may have a molecular weight in the range from about 1,000 to about 1,000,000. Moreover, polymers with a molecular weight from about 10,000 to about 100,000 are also within the scope of the invention. These polymers are capable of binding solutes such as RCRA metals in various oxidation states, non-metallic inorganics such as silicic acid, boric acid, antimonate, activation and fission product metals, actinides, lanthanides, transition metals, and organics such as organic acids, organic bases, and organic neutral compounds from aqueous solutions.

BRIEF DESCRIPTION OF THE DRAWINGS

A more particular description of the invention briefly described above will be rendered by reference to specific embodiments thereof which are illustrated in the appended drawings. These drawings depict only typical embodiments of the invention and are not therefore to be considered to be limiting of its scope. The invention will be described and explained with additional specificity and detail through the use of the accompanying drawings in which.

DETAILED DESCRIPTION OF INVENTION

Figure 1:
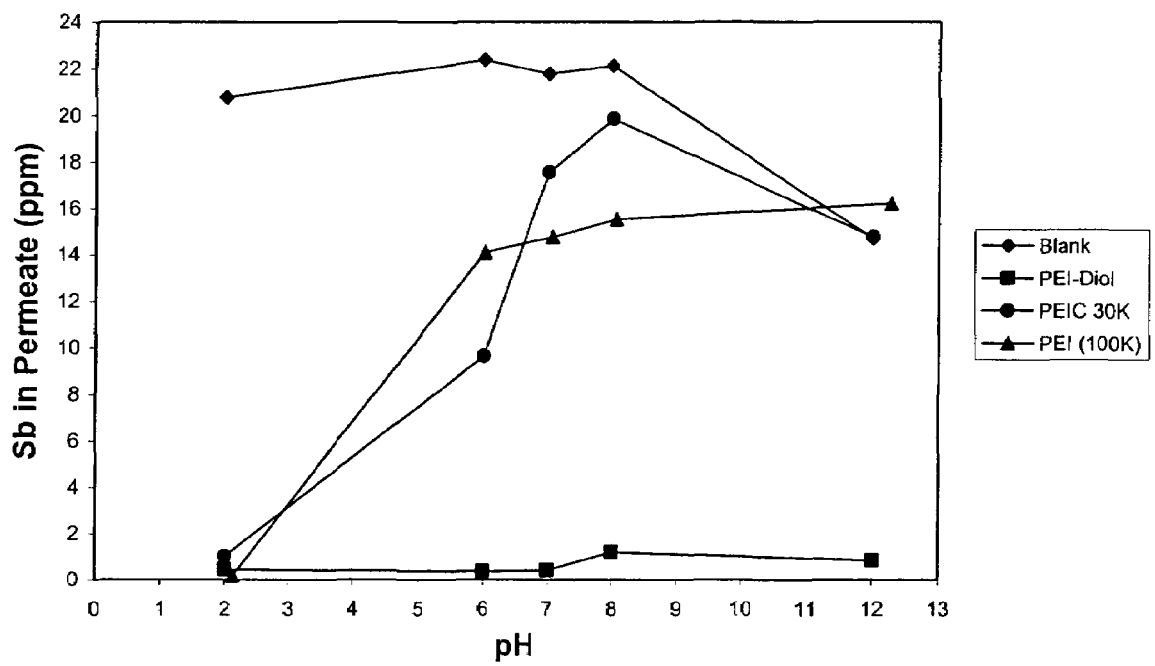
FIG. 1 is a graph of the binding of Sb(III) by various polymers as a function of pH.

The present invention relates to functionalized synthetic polymers that can be used to bind to molecules or ions dissolved in a solution or solutes. The polymers contain a functional group which can be selected to bind to a targeted solute in a solution. With the targeted solute bound to the functional group of the polymer, the solute may be readily removed from the solution.

The polymers can be water-soluble polymers that can be used in methods of Polymer Filtration technology. In general, Polymer Filtration involves contacting a solution containing a targeted solute with a soluble polymer capable of binding the targeted solute. The polymer and bound solute constitute a complex. The complex is then separated from the solution by a process such as ultrafiltration. Ultrafiltration is a pressure driven separation occurring on a molecular scale. As a pressure gradient is applied to a process stream contacting the ultrafiltration membrane, liquid including small dissolved materials is forced through pores in the membrane while larger dissolved materials and the like are retained in the process stream. The ultrafiltration membrane has a MWCO, which is less than the molecular weight of the water-soluble polymer. As the aqueous solution is forced through the ultrafiltration membrane, the complex is retained.

Both the complex and any uncomplexed water-soluble polymer are retained by the membrane of the ultrafiltration unit. Water and solutes can pass through the membrane. The retention of solutes during ultrafiltration depends on the membrane pore size. The molecular weight cut-off (MWCO) is generally defined as the molecular weight of spherical, uncharged solute which is 90 percent retained by the membrane. Thus, both size and shape can influence the MWCO. But for the Polymer Filtration process the pre-purification of the polymer through a larger MWCO ultrafiltration membrane using a diafilatration process and the use of a smaller MWCO ultrafiltration membrane in the process, assures that essentially none of the soluble polymer and the soluble-polymer complexes pass through membrane. By use of ultrafiltration, the complex can be concentrated and separated from the solution. After the separation, the targeted solute can be separated from the complex for recovery, recycle or disposal as desired.

Generally, there are two modes of operation in ultrafiltration. The first is a batch or concentration mode, where the volume in the retentate is reduced by simple ultrafiltration. The second mode is diafiltration. Diafiltration uses a stripping solution to remove the bound solute from the functionalized polymer. The stripping solution adjusts the chemistry of the solution such that the targeted solute is released from the water-soluble polymer. This solution of dissociated polymer and targeted solute is conveyed through an ultrafiltration membrane. The ultrafiltration membrane retains the water-soluble polymer and allows a purified, concentrated solution of the targeted solute to pass through. Thus, the targeted solute is purified and can be recovered in concentrated solution form, or in dry form by evaporating any remaining water.

An ultrafiltration unit can generally consist of hollow-fiber cartridges of membrane material having a MWCO from about 1000 to 1,000,000, preferably from 10,000 to 100,000. Other membrane configurations such as spiral-wound modules, stirred cells (separated by a membrane), thin-channel devices and the like may also be used. Among the useful ultrafiltration membranes are included cellulose acetate, polysulfone, and polyamide membranes such as polybenzamide, polybenzamidazole, polyurethane, polyethers, fluoropolymers, or combination of material types. Other membrane materials that are inorganic can be used including stainless steel and ceramic materials and other inorganic composites.

In certain other embodiments, the polymers may contain cross-linkages which render the polymers insoluble. Such functionalized insoluble polymers can be used in methods of solute removal from a solution other than Polymer Filtration. For example, a crosslinked polymer is generally solid or gel-like. A solid functionalized polymer can be formed into sized beads. Such beads may be contained in a filter cartridge or freely suspended in solution. Thus, a solution containing a targeted solute may be filtered through the filter cartridge, the polymeric beads binding to the targeted solute. In other configurations, the solid functionalized polymer may be used as a membrane filter or a coating for a surface. Thus, a solution containing the targeted solute may be contacted with the membrane of the coated surface, and the solute will bind to the functional groups of the solid polymer.

Though the solute selectivity could be retained in the solid form, the relatively rapid kinetics of a homogenous binding system is lost as a two-phase system (water and solid polymer) is established. However, if sized to smaller particles (micro or nano size) kinetics approaching the water-soluble polymers may be achieved. Cross-linking agents can include a variety of bifunctional agents such as dihalogen alkanes (e.g., 1,2-dibromomethane), dialdehydes (e.g., gluteraldehyde), dienes (e.g. 1,3 butandiene), diepoxides (e.g., diglycidol), and the like. Other modes of crosslinking can include radiation treatment producing radicals that allow the large soluble molecules to bind together forming insoluble polymers.

In general, a functionalized polymer of the present invention has a preformed synthetic polymeric backbone. The polymeric backbone can be one of many water-soluble polymers known in the art. For example the polymer may be PEI (polyethylenimine), PVA (polyvinylamine), PAA (polyallylamine), polyacrylamide, polyacrylic acid, polypyrrol, polyacrylic acid, or soluble polymers that have atoms such as nitrogens and oxygen that can easily undergo functional group attachment. One or more functional groups is covalently linked to the polymer. The functional group can be selected for its ability to bind to a particular solute. The functional groups can be, for example, a monol, a diol, a triol, a tetraol, glucarone, a dithiol, alpha-hydroxycarboxylic acid, a tartrate-imide derivative, an affinity group, a cavity of selected size that hosts the solute selectively, a cage-shaped host, a calixarene, an antibody, a Fab fragment of an antibody, a F(ab)$_2$ of an antibody, a polypeptide, an antigen, and like binding groups that have specificity for target solutes. It has been found that functional groups such as alpha-hydroxycarboxylic acid, diols and tartrates can bind solutes such as antimonate and boric acid. Dithiol functional groups can bind arsenic(III) and perhaps selenium ions.

A number of solutes may be bound by the functionalized polymers of the present invention. Such solutes can be metal ions such as RCRA metals, actinides, lanthanides, or transition metals such as copper, cobalt, nickel and zinc. Non-metallic acidic molecules containing boron, silicon, arsenic, selenium, iodine, and antimony, may also be bound by the functionalized polymer. The functional group may form an ionic bond with the dissolved molecule thereby allowing the molecule to be removed from the solution. However, a functionalized polymer containing a diol or thiol functional group may bind the solute via an ester or thioester formation interaction. Other functional groups form cage or inclusion guest-host interactions where the solute selectively fits into a cavity such as pyridine into a beta-cyclodextran functional group on a soluble polymer. Other functional groups can bind by coordinate covalent bonding or general polar interactions. Or, for some of the polymers, binding mechanisms may be mixtures of mechanisms. No matter the mechanism of solute binding, the polymers are designed to separate solutes from solutions either selectively, as a suite of solutes, or to remove very low levels of the solute from the solution.

A number of polymers may be created by attaching a tartaric acid to a polymeric backbone such as PEI or PAA. The addition of tartaric acid generally follows the reaction shown in Formula 10. While PEI is the polymer shown in Formula 10, other suitable polymer may be used. In Formula 10, "n" is an integer from about 12 to about 12,000. It will be appreciated that the functionalized polymer may contain one or more tartrate binding group with the remainder of the repeating units having NH$_2$. Diethyl-L-tartrate can be added to a solution of prepurified PEI in ethanol. The reaction is heated to reflux. After a period of time the reaction can be cooled and the products purified.

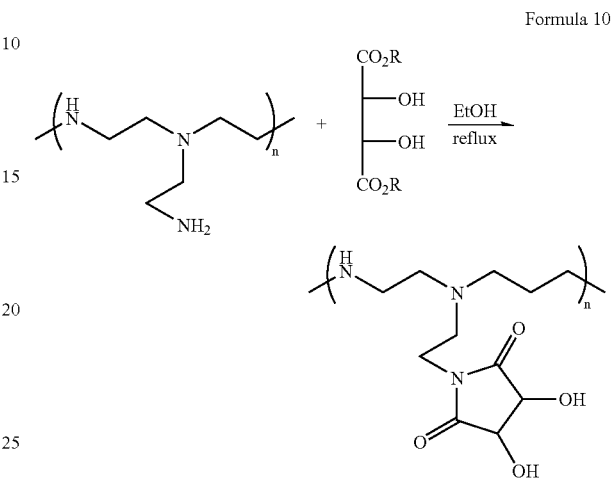

Formula 10

There are several possible tartrate structures that can result from direct reaction of diethyltartrate with PEI or another water-soluble polymer. Such structure may include the open ester (Formula 11), the diamide tartrate (Formula 12), and the cyclic tartrate imide (Formula 13). The open ethyl ester could be hydrolyzed to give the carboxylic acid functional group, giving the polymer duel functional groups that could target two different types of guest ions or molecules. To guarantee that the 5-membered imide-diol ring is formed it could be desirable to start with the preformed imide-tartrate and link it to soluble polymer backbone such as PEI with a linking agent such as epichlorinhydrin or chloroacetylchloride. The cyclic diol are particularly desirable because they have a good binding constant for boric acid without resorting to the attachment of complex sugars, while the cyclic and acyclic open diol tartrate acid could be particularly good for binding oxyanions of antimony. Further modification to the preformed tartrate ligand could be made to make higher numbers of alcohols on the ligand. The carbonyl groups could be readily reduced with a reagent that would convert them to alcohols, giving four alcohol groups on the five-membered ring or a tetraol.

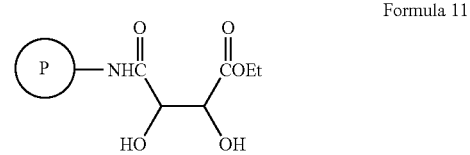

Formula 11

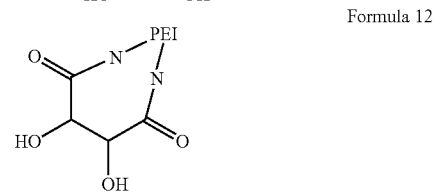

Formula 12

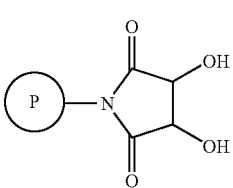

Formula 13

Functionalized polymers may also contain a simpler diol. For example the synthesis of PEI-Diol is shown in Formula 14. PEI is reacted with epichlorohydrin in the presence of methanol followed by NaOH treatment. A second synthetic approach involves reacting PEI with glycidol in water solvent giving the same functionalized polymer.

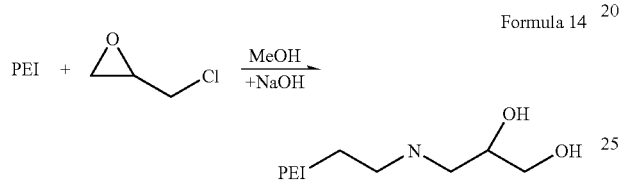

Formula 14

Another simple diol can be obtained by the reaction of 1-butene-3,4-diol with PEI or other appropriate backbone polymer to give a diol with 2 instead of 1 carbons linking group. If 2 equivalents of the diol-forming agent is added to the same nitrogen atom, in for example PEI polymer, a difunctionalized diol can be attained.

A branched triol is another functional group that may be linked to a polymeric backbone. The synthesis of PEI-triol is shown in Formula 15. A quantity of [tris(hydroxymethyl) aminomethane] (TRIS) is dissolved in ethanol. A portion of triethylamine is then added. The ethanolic solution is allowed to cool slightly. Then chloroacetyl chloride is added to the solution. The mixture is refluxed for a period of time and the solvent is removed.

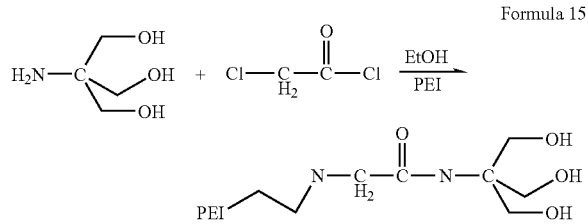

Formula 15

Another simple linear triol is a desirable functional group and could be prepared by protection of butanetetrol, such as a ketal, giving rise to a free primary alcohol, which can be activated, such as with tosylate. The reactive tosylate can be reacted with nitrogen on a preformed synthetic polymer backbone such as PEI to give a linear triol as shown in Formula 16. Another way of preparing the same linear triol is through the reaction of a nitrogen or oxygen group in a polymer backbone with 1-epoxide-3,4-dihydroxybutane or the ketal protected 1-epoxide-3,4-dihydroxybutane, followed by deprotection.

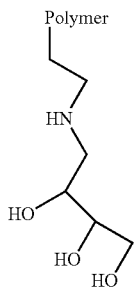

Formula 16

A polymer-glucarone functionalized polymer may also be created. Formula 17 shows the synthesis of PEI-glucarone. A portion of PEI is dissolved in water. D-glucurono-6,3 lactone is added to this aqueous PEI solution. The solution is stirred and refluxed for a period of time until the reaction product is formed. The solvent can then be evaporated and the product purified.

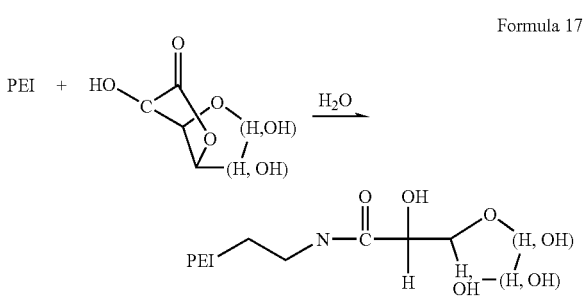

Formula 17

Additional polymers of the present invention may contain a dithio-binding group. As shown in Formula 18, dithiol groups covalently attached to a polymer (P) will bind to target solutes such as As(III) by means other than ion paring. Such dithiol interaction with As may make the reaction less sensitive to the pH and salt content of a solution. PEI-hydrolipoic acid is one polymer that can be synthesized that has the dithiol functionality. As shown in Formula 19, a quantity of PEI in DMF is added to a solution containing dl-thiotic acid and DCC. This solution is heated to reflux for a period of time, and the reaction product is purified by filtration. $NaBH_4$ is added, and the solution is stirred. The solvent may be evaporated to yield a reaction product.

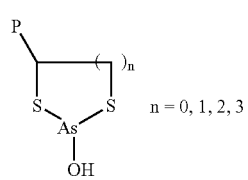

Formula 18

$n = 0, 1, 2, 3$

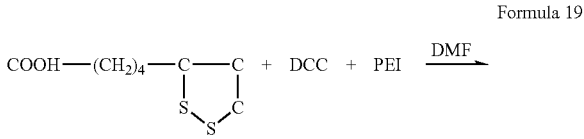

Formula 19

-continued

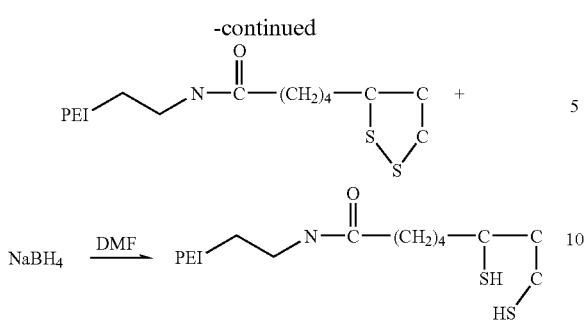

Other dithiol compounds can also be prepared from the attachment of other functional groups to PEI or suitable polymer backbones and they too would be useful for binding As(III) species and converting As(V) species to As(III) through an oxidation-reduction reaction. The dithiol can be oxidized to the disulfide by As(V) while the As(V) is reduced to As(III), which can then bind to the dithiol functionality in the polymer in the As(III) form. Another source of disulfide is the BAL ligand shown in Formula 20, the 2,3-dimercaptopropane-1-sulfonic acid shown in Formula 21, and 2,3-dimercaptosuccinic acid shown in Formula 22. Through protection of the dithiol group with a protecting agent and activation of the alcohol, sulfonic acid and carboxylic acid, respectively, these ligands can be attached to a polymer such as PEI. Another dithiol functionalized polymer could be formed by using analogs of lipoic acid, such as bisnor-lipoic acid shown in Formula 23 and tetranor-lipoic acid shown in formula 24.

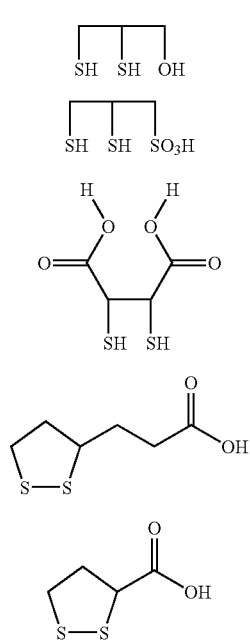

Formula 20

Formula 21

Formula 22

Formula 23

Formula 24

Additional polymers of the present invention may be prepared containing cyclodextran host functionality. The tosylate activated primary alcohol of either the alpha, beta, or gamma cyclodextran can be reacted with the primary or secondary nitrogens of prepurified PEI or other nitrogen-containing polymeric backbones to give the material shown in Formula 25.

Formula 25

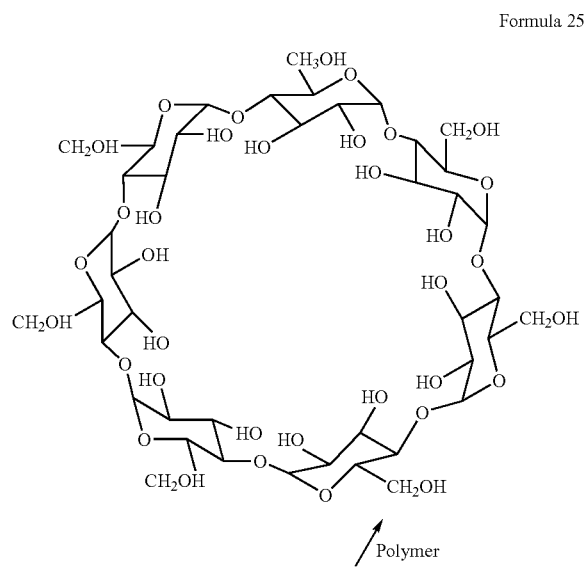

Additional polymers of the present invention may be prepared containing bis phosphonic acid functionality by reaction of tetraethylethenylidenebisphosphonate with a nitrogen-containing polymeric backbone to give the compound in Formula 26. This functional group is particularly useful for binding actinides and lanthanides and may have application for the binding of arsenic and selenium compounds.

Formula 26

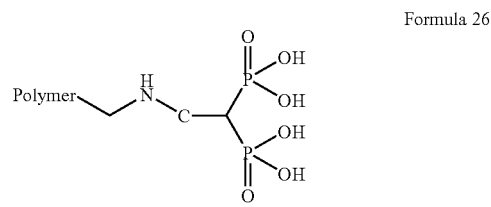

Additional polymers of the present invention may be prepared containing a series of functional groups that can be formed using the double bond addition reaction to nitrogen on a polymer backbone as used for the bisphosphonate in Formula 26. Examples of functional groups attched can include amides and diamides, ester and diesters, phoshonates, and diphosphonates, carboxylates and dicarboxylates, and a mixed carboxylate-phosphonate derivative.

Additional polymers of the present invention may be prepared containing alpha-hydroxycarboxylic acid groups. For example, an epoxide can be formed from the double bond in acrylic acid or ethylacrylate. The epoxide can then be reacted with an amine in a polymeric backbone to give a hydroxycarboxylic acid (after hydrolysis if the starting material is an ester) as shown in Formula 27. This functionality may be particularly useful for binding antimondates.

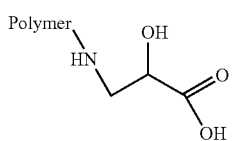

Formula 27

Additional polymers of the present invention may be prepared containing a peptide by reacting a protected peptide with the nitrogen on a polymer such as PEI as shown in Formula 28. For example, a polyglycine (7 glycines) group can be attached to a polymeric backbone by reacting a protected and activated peptide with PEI followed by deprotecting.

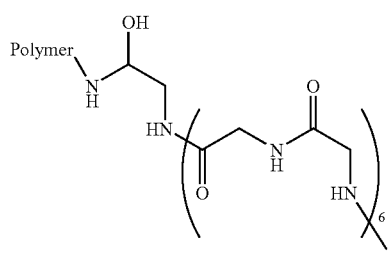

Formula 28

Additional polymers of the present invention may be prepared containing a pyridinium-group as shown in formula 29 prepared by, for example, reacting a 4-methyl-chloro-1-alkylpyridinium halide with the nitrogen of a prepurified soluble polymer such as PEI.

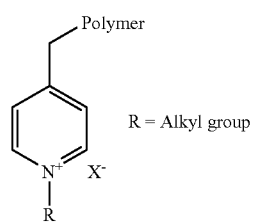

Formula 29

R = Alkyl group

Additional polymers of the present invention may be prepared containing cavities such as a calixarene groups as shown in Formula 30 prepared by, for example, reacting an alkylhalide substituted calixarene with the nitrogen of a prepurified soluble polymer such as PEI. The R groups can be any variety of species that enhance the cavity of the calixarene. Any number of cavity-containing soluble polymers can be prepared from the many that are known in the literature.

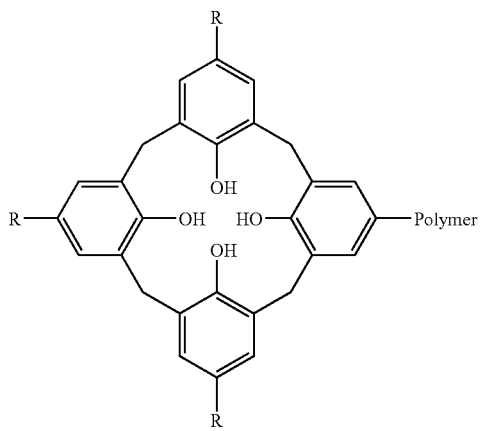

Formula 30

Additional polymers of the present invention may be prepared containing an antibody, a Fab fragment of an antibody, a F(ab)$_2$ of an antibody, an antigen, antibody groups, affinity groups, and host groups and like binding groups that have an affinity for target solutes, by the appropriate addition of the group through an appropriate linking agent to, for example, prepurified soluble polymer such as PEI or other appropriate backbone polymer.

Insoluble polymers can be obtained by crosslinking the functionalized water-soluble polymers with a variety of bifunctional agents such as dihalogen alkanes (e.g., 1,2-dibromoethane), dialdehydes (e.g., gluteraldehyde), dienes (e.g., 1,3-butandiene), diepoxides (e.g., diglycidol) and the like. Other modes of crosslinking can include radiation treatment producing radicals that allow the large soluble molecules to bind together forming insoluble polymers. Insoluble polymers can also be obtained by crosslinking a synthetic backbone polymer, such as PEI, before functionalization. In this way we can and have prepared a number of insoluble polymers using almost the same method as for the soluble polymers, but the final purification methods were different in that solvent-washing and simple filtration was used for solid polymer purification. The polymers are shown formulas 31 through 37:

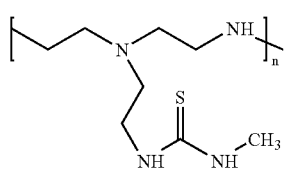

Formula 31

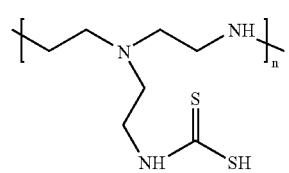

Formula 32

Polyethylenimine Carbon Disulfide (XPEI-CDS)

-continued

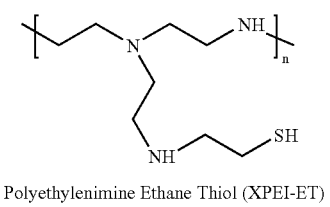

Polyethylenimine Ethane Thiol (XPEI-ET)

Formula 33

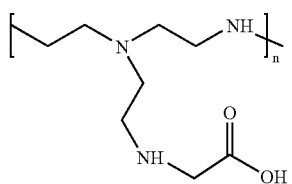

Polyethylenimine carboxylated (XPEIC)

Formula 34

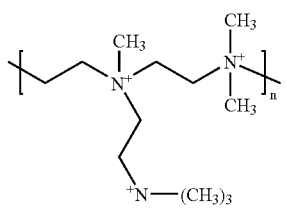

Permethylated Polyethylenimine (XPEIM)

Formula 35

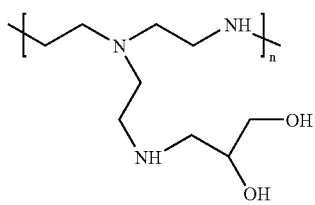

Polyethylenimine Diol (XPEI-Diol)

Formula 36

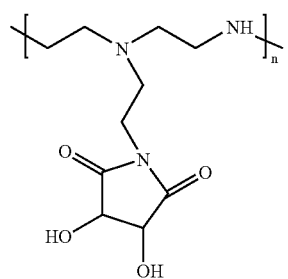

Polyethylenimine Tartrate (XPEIT)

Formula 37

Soluble polymers such as PEI, PEIM, PEIC, PEI-Thiol, PEI-G can be prepared in accordance with U.S. Pat. No. 5,928,517, which description and disclosure is incorporated herein by reference. These materials can also be crosslinked.

EXAMPLES

The following examples are given to illustrate various embodiments that have been made within the scope of the present invention. The following examples are neither comprehensive nor exhaustive of the many types of embodiments that can be prepared in accordance with the present invention.

Example A

Synthesis of PEI-Tartrate

A number of polymers may be created by directly attaching a tartrate group to PEI. For example Diethyl-L-tartrate (9.02 g, 43.75 mM) was added to a solution of pre-purified PEI (6.3 g, 43.75 mM) in 150 mL EtOH. The reaction was heated to reflux and stirred over night (15 hours). The mixture was cooled to room temperature, filtered, and the solvent was removed by rotary-evaporation. The crude product was dissolved in water and purified by diafiltration using MWCO>30,000 membrane. After removal of water, the desired polymer (9.5 g) was obtained. The FTIR spectrum shows one stretch at 1654 cm$^{-1}$, indicating that the starting ester (C=O, 1734 cm$^{-1}$) was consumed.

When tartrate is covalently linked to the polymeric backbone of PEI at least three possible configurations are possible. The ester carboxylate of the tartrate may form a cyclic tartrateimide, an open amide-monoester, or may form a diamide attached to two different nitrogen sites within the polymeric backbone. The open ester can then be hydrolyzed to give the monotartaric acid attached as a single amide to the polymeric backbone or a fourth structure. Because the IR spectrum showed only one carbonyl peak, and it is in the region of an imide it is likely that the cyclic imide compound was mostly formed.

To assure that the cyclic structure is formed another synthetic route was pursued where diethyl-L-tartrate (0.01 mol) was reacted neat with ethanolamine (0.01 mole). After heating the mixture for about 30 minutes at 50° C. the solution turned solid. After addition of 10 mL of ethanol to dissolve the solid and refluxing for one hour, a crystalline product was recovered upon cooling. After filtration, an ethanol wash, and air-drying, the imide product gave a melting point of 136–138° C. and an FTIR with a carbonyl absorption at 1648 cm$^{-1}$ for the imide group, similar to the direct addition product of the tartrate to the polymer. The recovered product was reacted with an equivalent of p-toluenesulfonic acid to form the p-tosyl derivative of the cyclic tartaric imide. The activated imide was reacted with PEI to give the cyclic tartrate of PEI.

Another route to the tartrateimide precursor was to protect the diol of the tartrate as a cyclohexanone ketal by reacting the diethyltartrate with cyclohexanone in toluene with a catalytic amount of acid such as p-chlorotoluenesulfonic acid, and azeotroping off the water to force the reaction to completion. After washing with 1% sodium hydroxide and with water to remove the acid and byproducts the product was dried over potassium carbonate and distilled under vacuum. The protected diethyltartrate can be used in the same manner as the unprotected tartrate to form the imide and has the advantage of being readily distillable once added to the ethanolamine. Another advantage of protecting the diol arises from removal of the diol from possible reaction with the p-chloro-toluenesulfonylchloride (p-TsCl) in the last step of activation of the alcohol before reacting the ligand with a nitrogen group on a soluble polymer such as PEI. It also makes isolation of the tosylated ligand easier to extract from the reaction solvent.

Example B

Synthesis of PEI-Diol

PEI-Diol can be readily synthesized. For the preparation of PEI-Diol in a 1:1 PEI/reactant ratio, 2.0 g (0.042 mol) of 90:10 PEI:H₂O solution and 3.93 g (0.042 mol) of epichlorohydrin were each dissolved in 50 ml of anhydrous methanol and placed in separated syringes fitted with 8 in. needles. The two syringes were mounted onto a SAGE Syringe Pump Model 351 that allowed the simultaneous addition of the PEI and epichlorohydrin in equal concentrations to the reaction flask. The reagents were added drop-wise at a rate of 1 mL/min into 20 mL1 of anhydrous MeOH under the protection of Argon with rapid stirring. After the addition was complete, the clear, colorless solution was allowed to stir for 24 hours at ambient temperature under Argon. Then, 42, mL (0.042) moles of a 1.0 M standardized KOH/MeOH solution was added drop-wise and the reaction brought up to reflux. After refluxing for several hours, the KCl was removed by filtration and the MeOH removed under vacuum leaving a viscous, translucent residue. The residue was dissolved in 100 ml of H₂O and then purified by ultrafiltration through a 30,000 MWCO membrane. Once six volume equivalents (600 mL) of permeate were collected, the aqueous solution was collected and then frozen in liquid nitrogen. Drying under vacuum to a constant weight gives 2.43 g of a white powder in 50% yield. Elemental Analyses: (C) 54.49%, (H) 9.79%, (N) 13.31%, (Cl) <2%. Percent functionalization based on the C/N ratio with respect to one functional unit for every monomer unit: 50%.

Preparation of the above in a 2:1 PEI/reactant ratio was performed exactly as the 1:1, with the exception that 0.021 mol of epichlorohydrin was used. The dried product was a white powder in 45% yield. Elemental Analyses: (C) 51.12%, (H) 9.82%, (N) 17.42% (Cl) 2.25%. Percent functionalization based on the C/N ratio with respect to one functional unit for every monomer unit: 49%.

In the reaction above the methanol solvent can be replaced with ethanol and the epichlorhydrin replaced with glycidol and the reaction stirred at between 50 to 85° C. for 3 hours and the same diol product can be obtained without the necessity of the base hydrolysis step. Using this modified procedure different levels of diol functionalization PEI have been prepared. Thus, 0.1, 0.25, 0.5, 0.75, 1.0, and 2.0 ratios of glycidol to PEI have been made giving 80 to 95% yields based on product weight determination after purification by ethanol removal by evaporation and diafiltration with water.

Further modification of the above procedure involved using water as solvent instead of ethanol. Thus, when 45 g of prepurified PEI (MWCO>100K) was reacted in 450 mL of water with 19.32 g of glycidol for 3 hours under reflux, 65 g of diol was obtained after diafiltration with 5 volume equivalents of water with a 100K MWCO membrane.

Example C

Synthesis of PEI-Triol(Branched)

5 grams (0.04 mol) of [tris(hydroxymethyl)aminomethane] was dissolved in 200 mL warm ethanol and then 1 equivalent (4.04 g) of triethylamine was added. After the ethanolic solution had cooled slightly, 1.2 equivalents (5.42 g) of chloroacetyl chloride was added drop-wise. The cloudy mixture was refluxed for 45 minutes and the ethanol removed by roto-evaporation. The resulting white semi-solid was dried in a vacuum oven at 60° C. overnight.

The above product was brought up in water and then added to 1% aqueous solution of 3.63 grams (2 equivalents) of 30K MWCO PEI assuming a 5% water contents. The mixture was brought to reflux and then 1 equivalent (1.6 g) of NaOH was added drop-wise as a 10 M solution. After refluxing for two hours, the mixture was cooled to room temperature and then ultrafiltrated through a 30K MWCO membrane washing with six volume equivalents of water. The product was left in solution as it becomes insoluble in water once it was dried under vacuum. Yield (based on dry weight) 85%. Elemental Analysis: (C) 40.73%, (H) 10.07%, (N) 19.75%. Percent functionalization based on C/N ratio with respect to one functional unit for every monomer unit: 36%.

Example D

Synthesis of PEI-Glucarone 5.0 grams (0.110 mol) of 30K PEI with an approximate 5% water content was dissolved in 1 liter of water to which was added 38.75 g (0.220 mol) D-glucurono-6,3 lactone (Aldrich) in 0.5 L of water while stirring rapidly. Once the addition was completed, the solution was refluxed for 45 minutes at which time the solution turned from clear to yellow to dark brown. After cooling the solution, the mixture was ultrafiltrated through a 30K MWCO membrane using 6 volume equivalents. Yield (based on dry weight): 26%. Elemental Analysis: (C) 44.30%, (H) 7.31%, (N) 10.52%. Percent functionalization based on one functional unit for every monomer unit: 49%. FTIR (KBr): 1616 cm$^{-1}$ (CONH₂). The use of degassed water and inert atmosphere yielded the same dark product.

Example E

Synthesis of PEI-Lipoic Acid (Dithiol)

PEI-lipoic acid was synthesized to create a water-soluble polymer with preorganized mercaptan functionality. To 10.66 g (0.24 mol, 10 equivalents) of PEI in DMF at 25° C. was added a solution of 5.0 g (0.024 mol, 1 equivalent) dl-thiotic acid and 5.36 g (0.026 mol, 1.1 equiv) DCC in 25 ml DMF. This solution was heated to 60° C., with stirring under inert atmosphere, for 24 hours. After filtering the DCU, 1.10 g (0.029 mol, 1.2 equivalents) of NaBH₄ was added. After stirring for three hours, the DMF was removed under high vacuum and the residue was suspended in 400 mL of water. The white translucent B(OH)₃ was removed by filtration through a 0.45 micron syringe filter. The clear, semi-translucent liquid was then diafiltrated through a 30K MWCO membrane collecting 7.5 volume equivalents of permeate. The polymer was left in solution as it becomes insoluble when dried under vacuum. Approximately 7 grams of polymer was produced by this reaction for a 20% yield. Elemental analysis: (C) 41.92%, (H) 8.72, (N) 18.00%, (S) 0.92%. Percent functionalization is based on one functional unit for every monomer unit: 1%.

Example F

Synthesis of PEI-Functionalized Polymers via a Michael Addition

Using specially designed combinatorial synthesis apparatus and a combinatorial synthesis approach a number of chelating polymers were prepared, using the Michael addition reactions of vinyl compounds to polyethylenimine (PEI). The reagents were added together and mixed for 2 hours under atmospheric conditions in 1:1 ethanol and water. The reagents are given in Table 1 below. All product polymers were obtained in greater than 80% yield and were analyzed by NMR and IR spectroscopy. Thus, a monoethylester of a carboxylic and a monophosphonate ester were prepared that could easily be hydrolyzed to give the carboxylic acid and phosphonic acid; several alkyl substituted monoamides were prepared with varying substituents on the amide nitrogen; and then several bisfunctionalized polymers were prepared, the bisphosphonate ethylester and a mixed ethyl ester of phosphonic acid and carboxylic acid. Both these bis esters can be readily hydrolyzed to produce the corresponding acid. For example, refluxing bisphosphonate ethylester for 6 hours with concentrated hydrochloric acid gives the bisphosphonic acid. This particular synthesis of bisphosphonic has been scaled to the 1 molar size and the material is particularly good for binding americium and plutonium. Thus, the vinyl group in a Michael reaction is a major route to a variety of differently functionalized polymers.

TABLE 1

Summary of reagents and product polymers prepared using PEI backbone.

Figure 4:
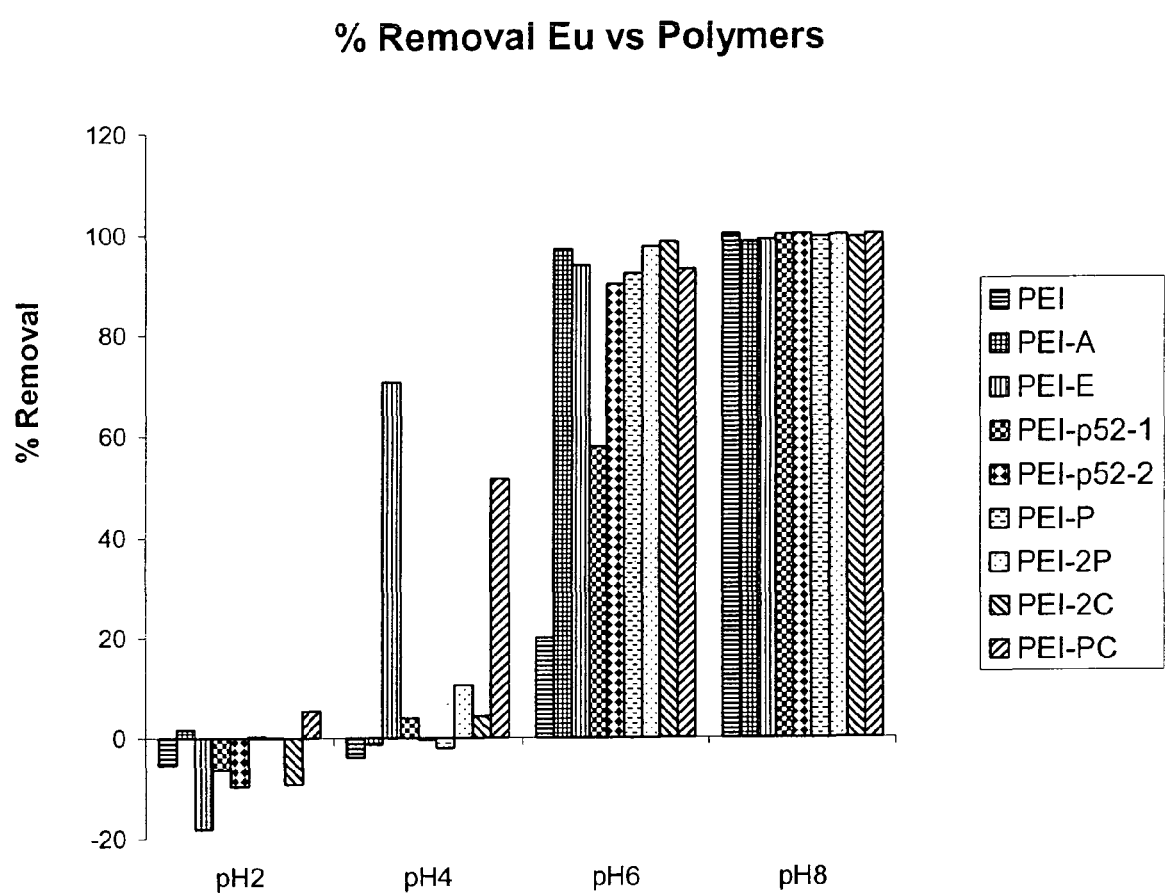
FIG. 4 shows Percent Eu(III) removal as a function of pH. Initial concentration of Eu was 50 ppm.

| Reagents | Code for FIG. 4 | Products |
|---|---|---|
| $CH_2=CH-CO-OCH_2CH_3$ | PEI-E | $PEI-CH_2-CH_2-CO-OCH_2CH_3$ |
| $CH_2=CH-CO-NH_2$ | PEI-A | $PEI-CH_2-CH_2-CO-NH_2$ |
| $CH_2=CH-PO-(OCH_2CH_3)_2$ | PEI-P | $PEI-CH_2-CH_2-PO-(OCH_2CH_3)_2$ |
| $CH_2=C-PO-(OCH_2CH_3)_2-CO-(OCH_2CH_3)$ | PEI-PC | $PEI-CH_2-CH-PO-(OCH_2CH_3)_2CO-(OCH_2CH_3)$ |
| $CH_2=C-(PO)_2-(OCH_2CH_3)_4$ | PEI-2P | $PEI-CH_2-CH-(PO)_2-(OCH_2CH_3)_4$ |
| $CH_2=CH-CO-N(CH_3)_2$ | PEI-p52-1 | $PEI-CH_2-CH_2-CO-N(CH_3)_2$ |
| $CH_2=CH-CO-NH-CH(CH_3)_2$ | PEI-p52-2 | $PEI-CH_2-CH_2-CO-NH-CH(CH_3)_2$ |
| $CH_2=C(CH_3)-CO-NH-CH(CH_3)_2$ | | $PEI-CH_2-CH(CH_3)-CO-NH-CH(CH_3)_2$ |
| $CH_2=C-(CO-(OCH_2CH_3))_2$ | PEI-2C | $PEI-CH_2-C-(CO-(OCH_2CH_3))_2$ |
| $PEI-CH_2-C-(CO-(OCH_2CH_3))_2$ | | $PEI-CH_2-C-(CO-(OH))_2$ |
| $PEI-CH_2-CH_2-CO-OCH_2CH_3$ | | $PEI-CH_2-CH_2-CO-OH$ |
| $PEI-CH_2-CH_2-PO-(OCH_2CH_3)_2$ | | $PEI-CH_2-CH_2-PO-(OH)_2$ |
| $PEI-CH_2-CH-PO-(OCH_2CH_3)_2CO-(OCH_2CH_3)$ | | $PEI-CH_2-CH-PO-(OH)_2CO-(OH)$ |
| $PEI-CH_2-CH-(PO)_2-(OCH_2CH_3)_4$ | | $PEI-CH_2-CH-(PO)_2-(OH)_4$ |

Example G

Synthesis of Solid Polymer Gels Containing Functionality used in Water-Soluble Polymers.

Crosslinked colorless PEI (2 g) was placed in a flask with 30 mL of ethanol and 3 mL of glycidol was added with stirring. The mixture was heated and refluxed overnight. The solid was filtered and washed with water and allowed to air dry to give 4.4 g of light yellow product of diol functionalized crosslinked PEI.

The crosslinked PEI was formed by polyethyleneimne (200 g of a 50% aqueous solution of Polymin P) dissolved in ethanol (1 L) followed by the addition of 1,3-dibromopropane (93.75 g, 0.46 moles). The solution was brought to reflux and stirrer for 5 hours. The solution was cooled to room temperature and 50% aqueous sodium hydroxide (100 mL) was added. The solution was stirred for 30 minutes followed by the collection of the solid polymer by filtration. The collected solid was washed several times with DI water until the filtrate was neutral in pH. Drying in an oven at 60 C overnight left 125 g of a slightly yellow solid.

In a similar manner, crosslinked PEI (2.8 g) was placed in a flask with 40 mL of ethanol and 9 mL of diethyl-L-tartrate was added with stirring. The mixture was heated and refluxed overnight. The solid was filtered and washed with water and allowed to air dry to give 3.39 g of dark yellow product of tartrate functionalized crosslinked PEI.

Example H

Synthesis of PEI-Triol(Linear)

Another simple linear triol is a desirable functional group and was prepared by protection of 1-butene-3,4-diol as the ketal by reaction 17.7 g of the butenediol with 20 mL of acetone in petroleum ether (100 mL) catalyzed with about 5 mg of p-toluenesulfonic acid overnight while azeotroping off the water (3.6 mL) and collecting the water in a Dean-Stark apparatus equipped with a $CaCl_2$ drying tube. The solvent/product was decanted from solid particles on the bottom of the flask and contacted with $K_2CO_3$. The solution was filtered and solvent removed at low temperature and the product distilled under vacuum to give the desired product in 70% yield. The NMR and IR were consistent with the product structure.

The epoxide was prepared from the buteneketal in chloroform by reaction of 11 g of the ketal with 22.5 g of dried m-chloroperbenzoic acid in chloroform (0.5 M)) by slow addition of the peracid to the buteneketal over 2 hours at room temperature. The solution was refluxed for 3 hours and allowed to cool and sit overnight. The solid p-chlorobenzoic acid was filtered from the chilled solution, the $CHCl_3$ solution was washed three times with 30 mL of 20% sodium bisulfite, three times with 10% Sodium bicarbonate, and 25 mL of sat NaCl. The solution was dried over $MgSO_4$, filtered, solvent remove, and product distilled under vacuum to yield 80% product. The NMR and IR were consistent with the structure of the desired product.

The linear triol was formed by reacting 23 mL of 10.3% prepurified aqueous PEI solution with 2.2 g of the epoxide-ketal prepared above and mixing for 9 hours at room temperature and then warming to 40° C. for 2 hours while reducing the volume. To remove the ketal protection group, water was added to the colorless concentrate and it was made acidic (pH 4–5) with HCl while keeping at room temperature. The solution was stirred all day, then chilled, made basic by the addition of base (NaOH) to pH 10 and diafiltered through a 30 K MWCO membrane with 5–6 volume equivalents of water. The aqueous concentrate was freeze-dried to give 3.5 g of product.

Example I

Synthesis of PEI-Monool

The monool was formed by reacting 74 mL of 10.7% prepurified aqueous PEI solution with 2.9 mL of the propylene oxide. The oxide was added over 1 hour with stirring to a chilled PEI solution. The reactions was stirred for about 24 hours at room temperature and then warmed to 50° C. for 3 hours under reduced pressure to remove any unreacted propylene oxide. The product was used without further purification.

Example 1

Polymer Binding of Antimony (III) and (V) at Various pH Values pH studies were performed with 10 ppm $Sb^{3+}$ and 1% PEI-Tartrate. The $Sb^{3+}$ was from an AA standard comprised of 1000 ppm $SbNO_3$ stabilized in 2% tartaric acid and 0.5% nitric acid. Enough prepurified PEI-Tartrate and DI water was added along with 0.1 mL of the 1000 ppm $Sb^{3+}$ standard to produce a 1% PEI-Tartrate, 10 ppm $Sb^{3+}$ solution. The pH of the solutions was adjusted with nitric acid from J. T. Baker, sodium hydroxide from Mallinckrodt, and DI water. Samples were made with pH values near 2, 6, 7, 8, and 12. After the pH was adjusted, the solutions were placed in 10,000 MWCO Centriprep-10 units and centrifuged for 1 hour at 3500 rpm. The 10,000 MWCO Centriprep-10 unit is an ultrafiltration device that allows molecules with a molecular weight of less than 10,000 to pass through the filter as permeate. 5 mL of this permeate was added to 2.5 mL of 4 M $HNO_3$ and 2.5 mL of DI $H_2O$. This solution was analyzed by ICP-AES. The acid was added in order to ensure no precipitate was formed. At all pH values the PEI-Tartrate bound the antimony as less than 0.5 ppm was found in the permeate in each case, which is the detection limit in the ICP for Sb. A blank in the absence of soluble polymer gave full permeation of the Sb(III), thus, none was retained by the membrane in the absence of polymer.

The second phase of pH studies consisted of attempting to bind several different polymers with $Sb^{3+}$. The source of the antimony(III) was $SbCl_3$ in a 0.1% HCl solution. Solutions were prepared in the same manner as describe above except that 0.2 mL was added instead of 0.1 mL to produce 20 ppm $Sb^{3+}$ solutions. This increase was an attempt to better evaluate the binding affinity of the polymers for $Sb^{3+}$. The ICP is not particularly sensitive to antimony, so it is necessary to work with slightly higher $Sb^{3+}$ concentrations. The final volume of the solutions was still 10 mL. Once again the samples were centrifuged in Centriprep-10 units and analyzed using the ICP-AES. Graphs of the pH study done with $Sb^{3+}$ are shown in FIG. 1. As can be seen for soluble polymers tested (PEI-C, PEI-Diol, PEI, blank) showed significant binding at pH 2. Only PEI-Diol showed significant binding at pH values other that 2, as the PEI-Diol bound the $Sb^{3+}$ considerably in both cases.

Figure 2:
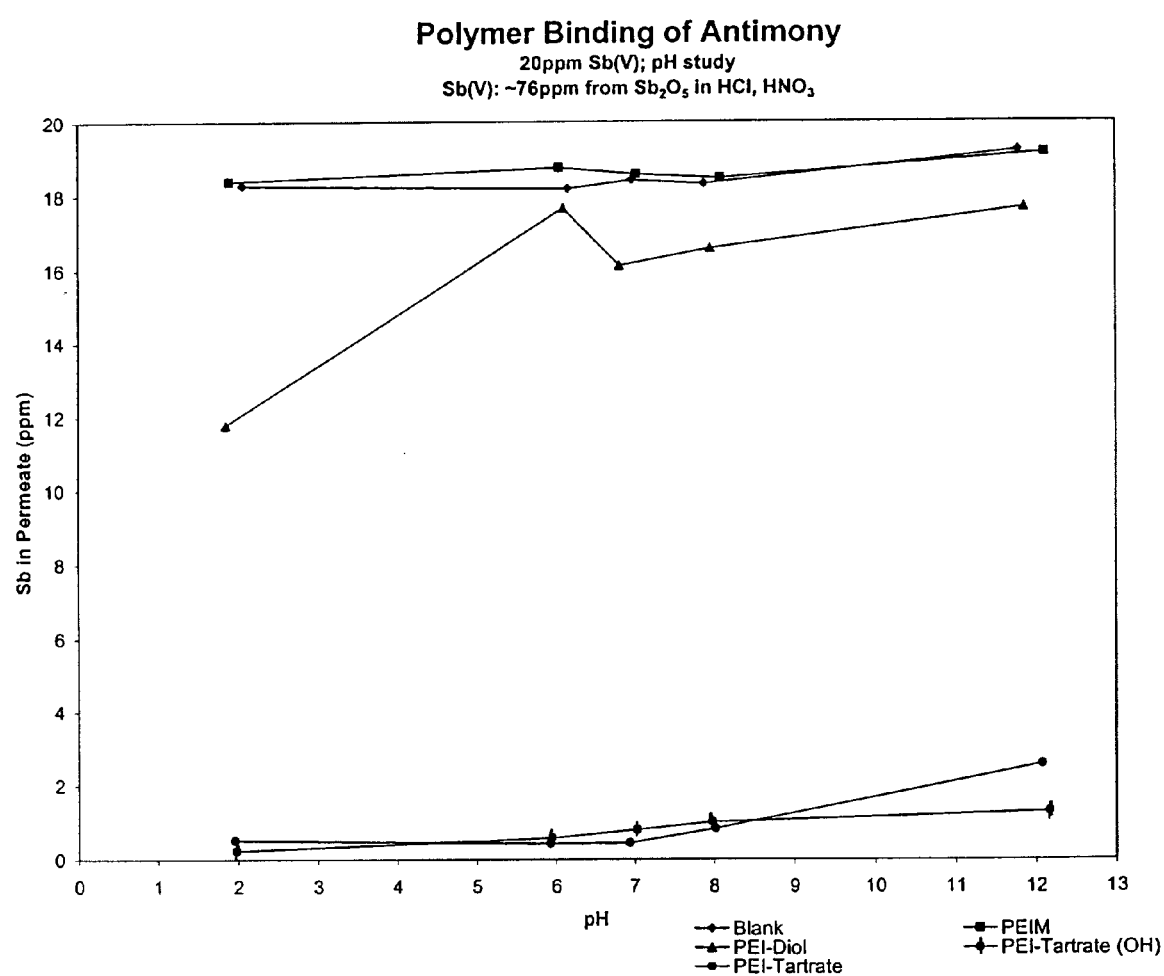
FIG. 2 is a graph of the binding of Sb(V) by various polymers as a function of pH.

The third part of this pH study is concerned with determining the affinity of certain water-soluble polymers for $Sb^{5+}$. Antimony(V) was obtained by dissolving $Sb_2O_5$ in a nitric acid/hydrochloric acid mixture with roughly 76 ppm $Sb^{5+}$ dissolving in the acid solution. This resulting solution was used as the source of the $Sb^{5+}$. The experiments were carried out in the same manner as the previous experiments. Enough polymer and DI water was added along with 2.63 mL of the ~76 ppm $Sb^{5+}$ standard to produce a 1% polymer, 20 ppm $Sb^{3+}$ solution. The pH of the solutions was adjusted with nitric acid, sodium hydroxide and DI water. Again, samples were made with pH values near 2, 6, 7, 8, and 12. The results of the pH study concerning the $Sb^{5+}$ is shown in FIG. 2. As can be seen the PEI-Diol did not bind the $Sb^{5+}$, but the PEI-Tartrate and PEI-Tartrate treated under hydrolysis conditions both bound the $Sb^{5+}$ exceptionally well compared to the other polymers tested.

Example 2

Polymer Binding of Cobalt

A general survey of PEIC 0.5 and PEIP 0.5 was performed at pH values 7 and 8. The study consisted of solutions containing 10 ppm $Co^{2+}$ ion contacted with 1% polymer solutions at pH 7 and 8. Blanks consisting of 10 ppm $Co^{2+}$ and no polymer were also tested. The solutions were made by adding polymer, DI water, and $Co^{2+}$, then adjusting the pH. The final volume of the solution was 10 mL. The pH was adjusted using nitric acid made by J. T. Baker, sodium hydroxide made by Mallinckrodt, and doubly deionized water. Once the pH had been adjusted the solutions were centrifuged using a 10,000 MWCO Centriprep-10 unit made by Amicon at 3500 rpm for 30 min. 5 mL of the permeate was diluted with 2.5 mL of 4 M nitric acid and 2.5 mL of DI water to prevent any precipitation. This resulting solution was then analyzed in an ICP-AES from Thermal Jerrell Ash.

Figure 3:
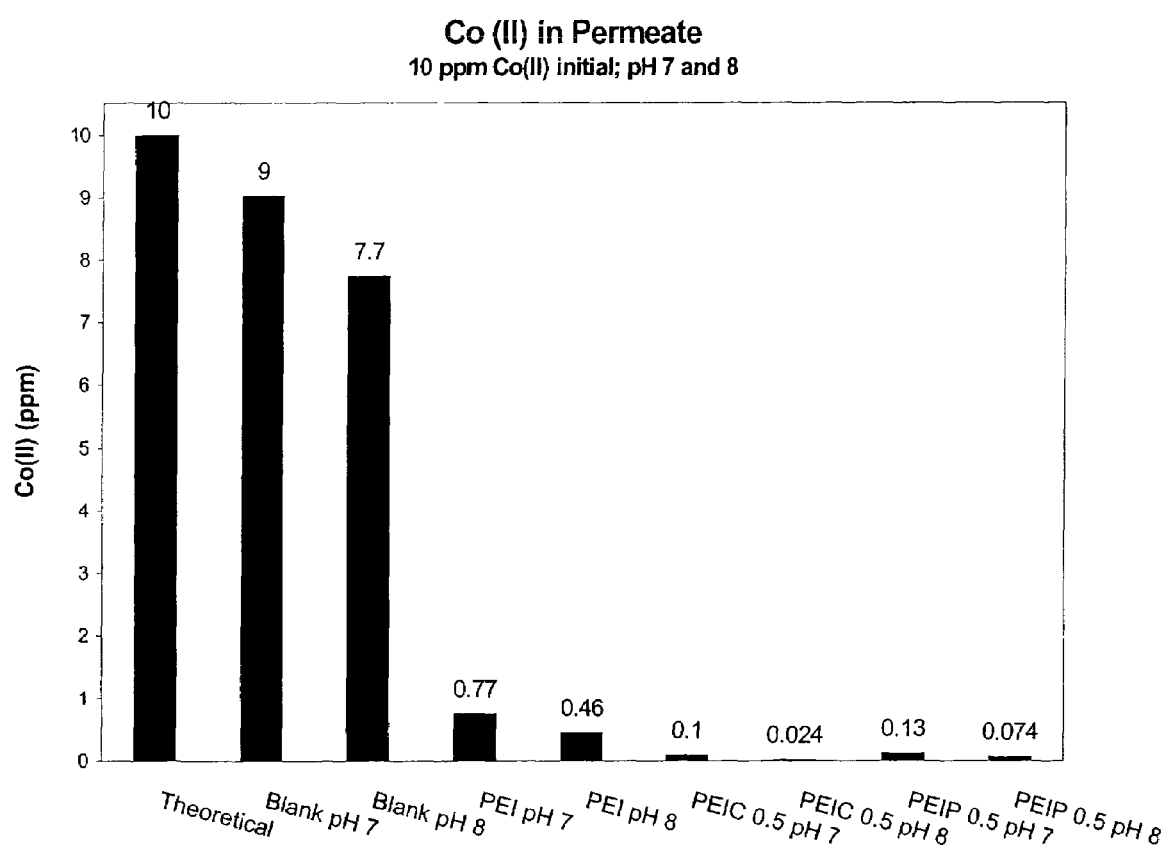
FIG. 3 shows the Percent Co(II) removed by 1% solutions of PEI, PEIC, and PEIP at pH 7 and 8. Initial concentration of Co(II) was 10 ppm.

Results of the initial polymer binding survey appear in FIG. 3. As seen in FIG. 3, PEIC 0.5 and PEIP 0.5 both appear to bind $Co^{2+}$ considerably well as less than 0.15 ppm passed through the permeate. PEI also appears to bind the $Co^{2+}$ slightly better than PEIP 0.5. There are probably mixed complexes formed between the polymer backbone and the attached ligands.

Example 3

Polymer Binding Studies Using Rapid Assay Techniques

The polymers prepared from Table 1 were tested using Centricon-10 ultrafiltration units. To test the concept of rapid testing, in this study we used ICP analysis techniques. Six metals (50 ppm) in groupings of three each were tested at four different pH values under conditions of constant ionic strength (0.1 with $NaNO_3$) and constant polymer concentration (0.1%) for the nine polymers that were prepared in Example F. This represented 24 different testing conditions that were completed in just a few days using this rapid survey technique. The plot of the data for europium (Eu), often a surrogate for americium (Am), is given in FIG. 4. Analysis of the results indicate that polymer PEI-E should be evaluated further as a possible candidate for study as it gave some binding at lower pH values compared to the other polymers.

Example 4

Polymer Binding Study of Actinides with Bisphosphoryl-PEI (PEI-DP)

The ability of bisphosphoryl-PEI polymer to bind americium at various pH values was investigated. A stock solution of 1% w/v PEI-DP in water, a stock solution of 1 M $NaNO_3$ in water, and stock solution Am-241 in acid were prepared. 1.2 mL of the 1% polymer solution was added to 1.2 mL of the NaNO$_3$ solution, which was spiked with 6 uL of Am stock solution. The pH was adjusted and the volume diluted to 12 mL, mixed at room temperature or 30 minutes, and the final pH value read with a pH meter. 2-mL aliquots were placed in preweighed Centracon-10 tube in duplicate for each pH value tested and centrifuged until approximately half of the solution filtered. The halves of the Centricon-10 unit were weighed and the top and bottom half placed in separate scintillation vials with Optifluor AF scintillation solution and counted by a Packard liquid scintillation analyzer. The adsorption or binding ability of the polymer for metal ions was expressed as the distribution coefficient ($K_d$), which is defined as: [total bound actinide/total free actinide]×[phase ratio]. The phase ratio is the sample volume/gram of polymer used in the sample. The results shown in Table 2 below indicate that very high $K_d$ values were attained for the bisphosphonic acid polymer compared to the previously studies monophosphonic acid, PEI-P polymer.

Table 2. Binding results of PEI-DP with the actinide americium-241 compared with PDI-P at similar pH values.

| pH | Average Log $K_{d\ Am-241}$ For PEI-DP | pH | Average Log $K_{d\ Am-241}$ For PEI-P |
|---|---|---|---|
| 2.3 | 5.327 | 2.0 | 3.94 |
| 4.3 | 7.465 | 4.0 | 4.81 |
| 6.3 | 7.262 | 6.0 | 4.91 |

Example 5

Polymer Binding of Boron at Various pH Values

The ability of different polymers to bind boron at various pH levels was investigated. A set of solutions containing 100 ppm boron as boric acid were created. Each solution also contained PEI, PEI-Diol, or PEI-Tartrate at a concentration of 1%. The pH of each solution was adjusted using NaOH or HCl to pH 3, 7 or 11. The solutions were allowed to sit for a period of time to allow the polymer to bind to the boric acid. After sufficient time, the solutions were subjected to ultrafiltration, and permeate was analyzed for boron concentration. It was found that PEI was unable to bind boric acid at any pH used in this study. PEI-Diol binding was maximal at pH 11 with about 50% of the boron bound. PEI-Tartrate was the most efficient binder of boric acid studied with a binding of 80% of the boric acid at pH 7.

Example 6

PEI-T Binding of Boric Acid at Various pH

In the previous example PEI-Tartrate was found to be the most efficient binder of boron. An experiment was designed to further explore the boric acid binding capabilities of PEI-Tartrate.

Figure 5:
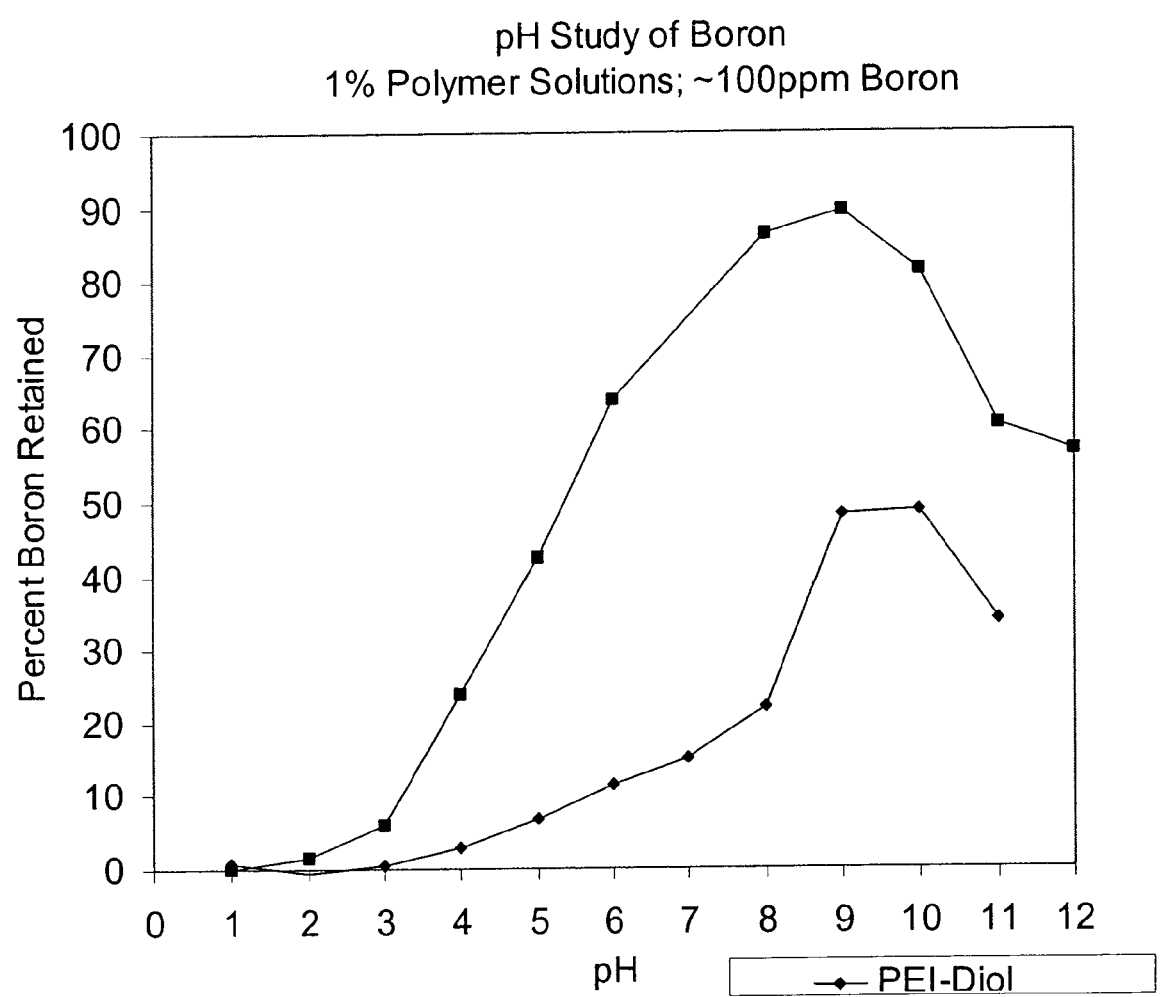
FIG. 5 is a pH dependency study for the binding of 100 ppm boron as boric acid with 1% wt/v solutions of water-soluble metal-binding polymers.

Twelve samples were prepared each containing 1% polymer and 100 ppm boron. Each sample had a pH between 1 and 12. The pH was adjusted for each sample by the addition of HCl or NaOH. Each sample was stirred and then allowed to sit for the binding of the polymer to the boron. The samples were then subjected to ultrafiltration and permeate analyzed for boron concentration. The results of the binding study are shown in Table 3 and plotted in FIG. 5. The ability of PEI-Tartrate appears to be maximal at a pH range of about 8.0 to about 10.0. At higher pH levels the polymer is competing with hydroxide ions in solution, which limits the percent of boric acid retained. This creates a maximal binding, which begins to drop off at a pH of about 11.0.

TABLE 3

Binding of Boric acid as a Function of pH.

| Polymer | pH | Boron in Permeate (ppb) | % Boron Retained by the Polymer |
|---|---|---|---|
| Blank |   | 111.4 | — |
| PEI-Tartrate | 1 | 112.9 | 0% |
| PEI-Tartrate | 2 | 109.8 | 1.436% |
| PEI-Tartrate | 3 | 104.7 | 0.014% |
| PEI-Tartrate | 4 | 94.98 | 23.75% |
| PEI-Tartrate | 5 | 63.93 | 42.61% |
| PEI-Tartrate | 6 | 40.30 | 63.82% |
| PEI-Tartrate | 7 | — | — |
| PEI-Tartrate | 8 | 15.36 | 86.21% |
| PEI-Tartrate | 9 | 11.73 | 89.47% |
| PEI-Tartrate | 10 | 20.77 | 81.36% |
| PEI-Tartrate | 11 | 44.12 | 60.39% |
| PEI-Tartrate | 12 | 48.17 | 56.76% |

Example 7

PEI-Diol Binding of Boric Acid at Various pH

The ability of PEI-Diol to bind boron at varying pH levels was investigated. Eleven samples were prepared each containing 1% polymer and 100 ppm boron as boric acid. Each sample had a pH between 1 and 11. The pH was adjusted for each sample by the addition of HCl or NaOH. Each sample was stirred and then allowed to sit for the binding of the polymer to the boron. The samples were then subjected to ultrafiltration and permeate analyzed for boron concentration. The results of the binding study are shown in Table 4 and in FIG. 5. The ability of PEI-diol appears to be maximal at a pH of about 9.0 to about 10.0. At higher pH levels the polymer is competing with hydroxide ions, which limits the percent of boron retained. This creates a maximal binding, which begins to drop off at a pH of about 11.0.

TABLE 4

Binding of Boric acid by PEI-Diol as a Function of pH.

| Polymer | pH | Boron in Permeate (ppb) | % Boron Retained by the Polymer |
|---|---|---|---|
| Blank |   | — | — |
| PEI-Diol | 1 | 99.33 | 0.67% |
| PEI-Diol | 2 | 100.5 | −0.50% |
| PEI-Diol | 3 | 99.45 | 0.55% |
| PEI-Diol | 4 | 97.25 | 2.75% |
| PEI-Diol | 5 | 93.23 | 6.77% |
| PEI-Diol | 6 | 88.50 | 11.50% |
| PEI-Diol | 7 | 84.98 | 15.02% |
| PEI-Diol | 8 | 77.90 | 22.10% |
| PEI-Diol | 9 | 51.91 | 48.09% |
| PEI-Diol | 10 | 51.21 | 48.79% |
| PEI-Diol | 11 | 65.99 | 34.01% |

Example 8

Boric Acid Binding Over Time

It was previously determined that the ability of the PEI-Tartrate and PEI-Diol to bind boron was affected by pH. An experiment was designed to determine if the effect of time of contact with the polymers before ultrafiltration had an effect on the amount of boron bound by the polymer. Three sets of four solutions were created. Each solution contained 1% polymer and had a boron concentration of 100 ppm. The first two solutions contained PEI-Tartrate, and the second two solutions contained PEI-Diol. The solutions had either a pH of 6.0 or 9.0. The solutions were stirred on a shaker. A first set of solutions was subjected to ultrafiltration immediately upon preparation of the solution. A second set of solutions was subjected to ultrafiltration after 30 minutes of shaking. A third set of solutions was subjected to ultrafiltration after being shaken overnight. Permeate from each solution was analyzed for boron concentration. As seen in Table 5, the PEI-Tartrate was a better binder of boron. A slight improvement in boron binding was seen after being mixed overnight but the increase was not significant, indicating that the binding reaction was fast relative to the sampling time.

TABLE 5

The effect of time and mixing on boron binding.

| | | % Boron Retained | | |
|---|---|---|---|---|
| Polymer | pH | No time | 30 minutes | Overnight |
| PEI-Diol | 6.0 | 1.84 | 1.49 | 1.57 |
| PEI-Diol | 9.0 | 38.75 | 39.21 | 40.32 |
| PEI-T | 6.0 | 55.09 | 55.08 | 58.04 |
| PEI-T | 9.0 | 70.6 | 86.5 | 89.24 |

Example 9

Binding of Silicic Acid as a Function of pH with Three Polymers

Figure 6:
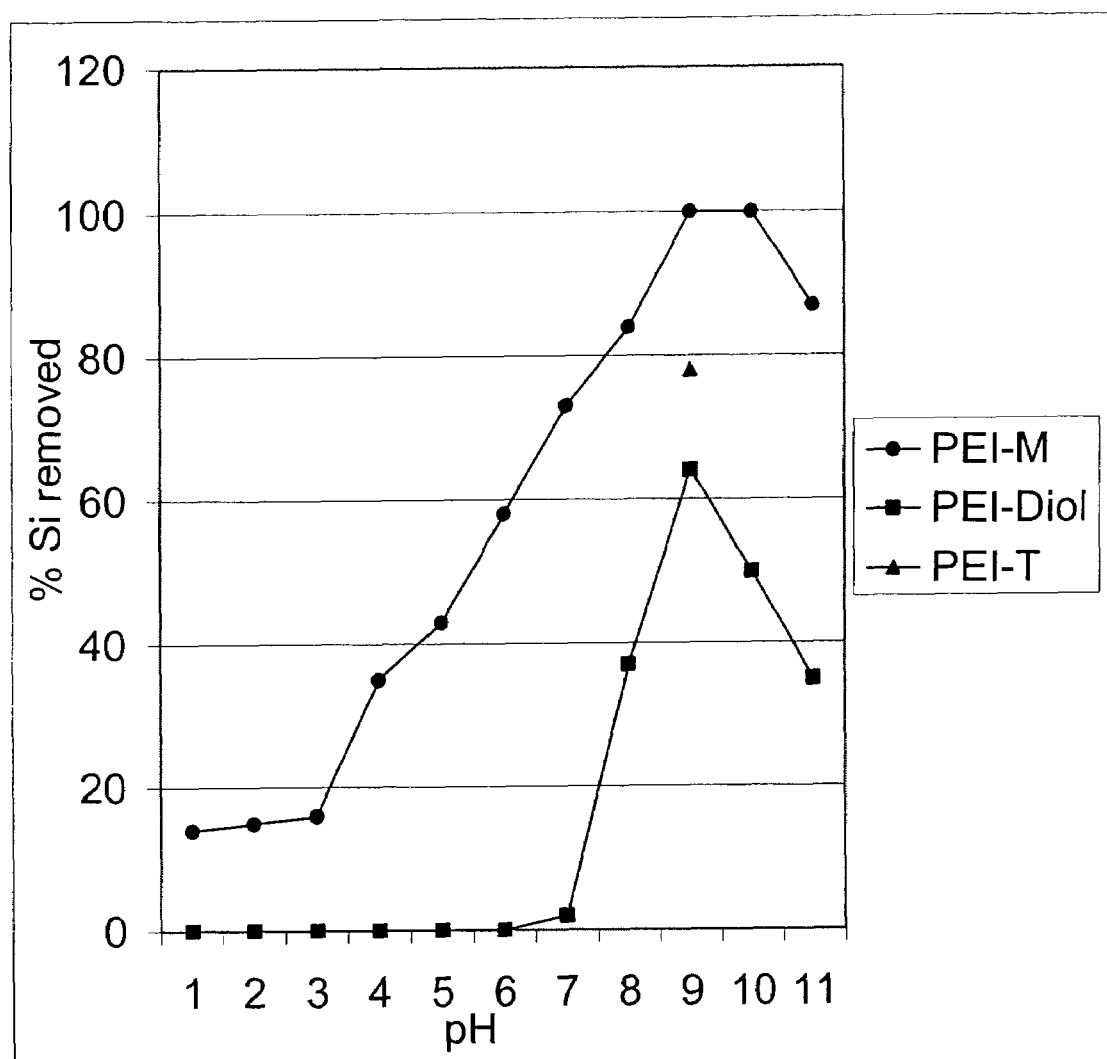
FIG. 6 is a pH dependency study for the binding of 100 ppm $Si(OH)_4$ with 1% wt/v solutions of water-soluble metal-binding polymers.

Experiments have been performed to test the removal of silicic acid ($Si(OH)_4$) from aqueous systems. These studies were performed as a function of pH between 1 and 12 at a starting $Si(OH)_4$ concentration of 100 ppm using several different polymers. No ionic strength adjusters were added. The experiments were performed by preparing $Si(OH)_4$ (Baker) solutions, adding the polymer to form 1% wt/vol solutions, and adjusting to the appropriate pH (NaOH or $HNO_3$, Fisher). Solutions were mixed for about an hour and ultrafiltered through a 10K MWCO membrane (Centracon 10 units, Amicon) using centrifugal force. The concentration of $SiO_2$ in permeate was determined using ICP-AES in comparison with Spex Standards. Deionized water used for dilutions was determined to contain nonmeasurable amounts of $SiO_2$ (detection limit ca. 1 ppm). The results are shown in Table 6 and plotted in FIG. 6 for three different polymers, PEIM, PEI-Diol, and PEI-Tartrate. There was only a very small amount of PEI-Tartrate available so it was tested at the maximum retention for the other polymers. It can be seen that there is a definite pH dependency for silica removal with the maximum for PEI-Diol and PEIM being at pH 8.8. No removal is observed at pH values below 3 for any of the polymers. Almost 100% removal is observed for PEIM at its maximum. The low removal at low pH values indicates that the polymers could be regenerated in the low pH range. The fall off of binding at very high pH also indicates that stripping with base could be an option for polymer regeneration.

TABLE 6 pH dependency study for the binding of 100 ppm $Si(OH)_4$ with 1% wt/v solutions of water-soluble metal-binding polymers.

| PH | % Si removal with PEIM Polymer | % Si removal with PEI-Diol Polymer | % Si removal with PEI-T Polymer |
|---|---|---|---|
| 1 | 14 | 0 | — |
| 2 | 15 | 0 | — |
| 3 | 16 | 0 | — |
| 4 | 35 | 0 | — |
| 5 | 43 | 0 | — |
| 6 | 58 | 0 | — |
| 7 | 73 | 2 | — |
| 8 | 84 | 37 | — |
| 9 | 100 | 64 | 78 |
| 10 | 100 | 50 | — |
| 11 | 87 | 35 | |
| 12 | | 21 | |

Example 10

Binding of Arsenic and Arsenous Acid as a Function of pH with PEI-SH Polymer

It is anticipated that dithiols will bind better than monothiols. Using PEI-SH prepared as described in U.S. Pat. No. 5,928,517 such description incorporated herein by reference, as a baseline monothiol functional group attached to PEI, binding studies of As(III) were performed. All solutions were diluted to a final volume in volumetric flasks. For all tests PEI-thiol solutions were prepared fresh the day of testing by ultrasonic-assisted dissolution in water, and pH adjusted with NaOH/HCl. PEI solutions were prepared with a 12.86% by weight 30,000 MWCO aqueous PEI stock solution adjusted to the desired pH, and diluted to the correct volume. For all tests As(III) solutions were prepared fresh the day of testing by diluting a 3964 ppm arsenious acid stock solution, adjusting the pH, and diluting to the correct volume. As(V) solutions were prepared as needed by dissolving $Na_2HAsO_4$ in water, adjusting pH, and diluting.

Figure 7:
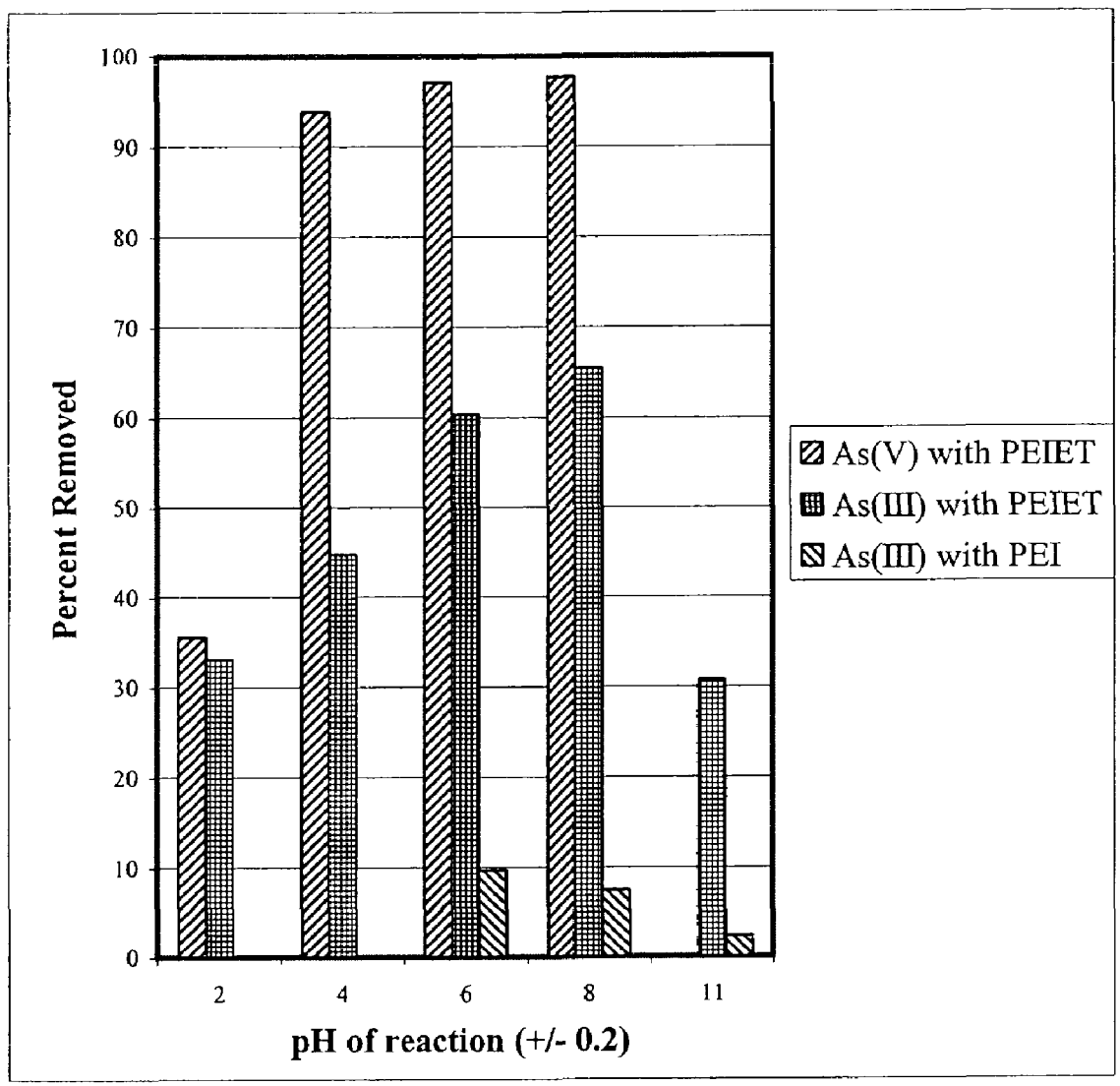
FIG. 7 shows the percent removal at five different pH values for As(III) with PEI and PEI-ET and As(V) with PEI-ET

In all tests, stock solutions of polymer and arsenic were prepared such that 18 mL of polymer solution and 2 mL of arsenic solution could be combined without further dilution or pH adjustment. Tests indicated that pH did not change before or after the reaction, negating the need for a buffering solution. Reactions were stirred in round bottom flasks with stir bars for one hour at room temperature unless otherwise indicated. Transferring the reaction solution to a 10,000 MWCO Centriprep-10 unit and centrifuging to separate the unreacted arsenic from the polymer-arsenic complex quenched reactions. The arsenic concentration in the filtrate was quantified by ICP-AES, which was blanked with water, calibrated using three standard concentrations of arsenic and fit to a linear regression with a correlation coefficient of 0.999 or better. Filtrate concentrations always fell within the range of calibration standards. Tests were performed to determine the optimum conditions for As(III) and As(V) removal as a function of pH. Unless otherwise indicated, all tests were run at approximately 10 ppm arsenic and 3000 ppm polymer. As-binding studies were performed as a function of pH (As(III) and As(V) removal with both PEI and PEI-ET at pH values of 2, 4, 6, 8, and 11) and As(III) removal as a function of sulfate concentration.

pH Dependency Studies: Arsenic removal by PEI and PEI-ET are both dependent on the pH of the aqueous solution. FIG. 7 shows the percent removal at five different pH values for As(III) with PEI and PEI-ET and As(V) with PEI-ET. It is known that the polymer PEI is a weak base anion exchanger and performs optimally in acidic solutions to bind anions. In order to bind with PEI or the PEI backbone of PEI-ET, arsenic must be an anion. The first pKa for As(III) is 9.2, thus we expect As(III) to have ionic interactions with PEI above a pH of approximately 8.5. The improvement of binding of As(III) when PEI was replaced with PEI-ET, at every pH, is attribute to the introduction of the covalently bonding sulfur groups. PEI-ET was able to remove most As(V) at neutral pH values (97%), however, this interaction is most likely an ion-pairing interaction. The pKa values of As(V) are 2.2, 6.8, and 11.6, thus at neutral pH As(V) is a mixture of mono- and dianions. Under acidic conditions (pH 2) and basic (pH 11) conditions we observed that PEI-Thiol removed less As(V) because either the As(V) was uncharged (pH 2) or the polymeric backbone was uncharged (pH 11) forbidding the formation of an ion pair. Generally, for drinking water applications we would be interested in the natural pH range of drinking water, which is between pH 6 to 8 and in that region the maximum amount of both As(III) and As(V) removal was observed.

Figure 8:
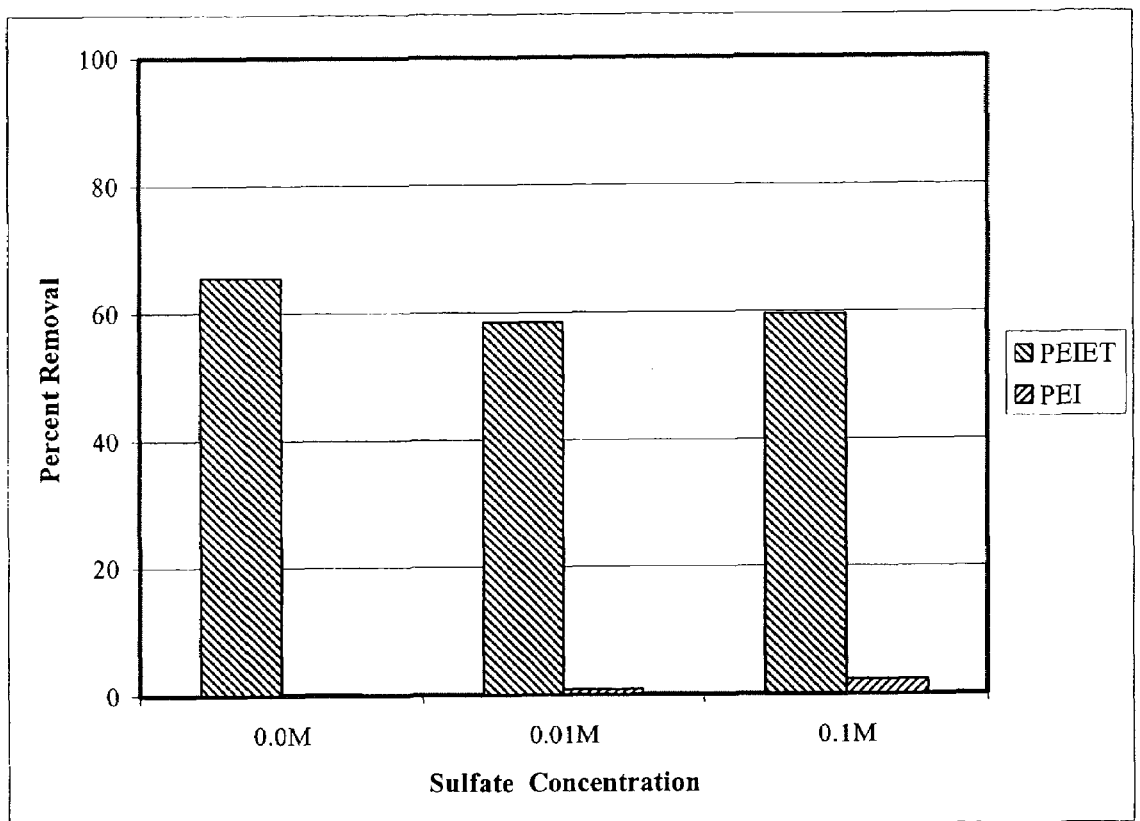
FIG. 8 shows the removal efficiencies of As(III) at high sulfate concentrations by PEI-ET and PEI.

PEI-ET removal efficiencies of As(III) at high sulfate concentrations were tested and the results indicated that sulfate was not an aggressive competitor to As(III) for PEI-ET as shown in FIG. 8. There was a small change in As(III) removal at 0.01 M sulfate and 0.1 M sulfate. In the pH study discussed earlier, the it was hypothesized that As(III) interaction with PEI-ET was most likely a covalent bond interaction, these sulfate studies add support to that hypothesis.

Example 11

Binding Capacity of PEI-Diol to Metal Ions

A stock solution of PEI diol was prepared. The polymer solution contained about 20% polymer. Eight stock solutions containing dissolved metal ions were prepared for Ni, Cd, Cu, Pb, Zn, and Eu. Each solution contained about 0.785 mM of the dissolved metal ion. A stock solution of 0.5 M $NaNO_3$ was also prepared.

About 0.625 g of the 20% polymer solution was added to a 25 mL volumetric flask. 5.00 mL of the 0.5 M $NaNO_3$ solution was added to the flask. 5.00 mL of the 0.785 mM metal solution was added to the flask. The pH of the resulting solution was adjusted by the drop-wise addition of $HNO_3$ and NaOH as needed. After the pH was adjusted the flask was filled to the 25 mL mark by the addition of deionized water. These steps were repeated for each of the metal solutions. Blank solutions were prepared following the same procedure without the addition of the polymer solution. After the addition of the reagents the flasks were stirred and allowed to sit for a period of time.

Then about 2 mL of each solution was transferred to a centricon tube with a membrane filter. The tubes were centrifuged for 30 minutes. At which time the 1.00 ml of the permeate was diluted with 9.00 mL of deionized water and analyzed on ICP. Tables 7 and 8 show the results of this binding assay.

TABLE 7

Binding of Metal Ions by PEI-Diol as a Function of pH.

| pH | Cd | % Cd ret | Cu | % Cu ret | Eu | % Eu ret |
|---|---|---|---|---|---|---|
| 1.04 | 18.54 | 0.00 | 11.59 | 0.00 | 26.15 | 0.00 |
| 2.06 | 17.39 | 1.47 | 7.23 | 27.59 | 24.71 | 0.00 |
| 2.95 | 18.67 | 0.00 | 0.92 | 90.81 | 26.35 | 8.50 |
| 4.05 | 14.67 | 16.88 | 0.27 | 97.30 | 25.56 | 0.00 |
| 5.05 | 2.83 | 83.98 | 0.18 | 98.23 | 21.63 | 9.35 |
| 6.05 | 0.27 | 98.50 | 0.15 | 98.52 | 16.30 | 31.68 |
| 7.10 | 0.16 | 99.12 | 0.10 | 98.98 | 5.69 | 76.16 |

TABLE 8

Binding of Metal Ions by PEI-Diol as a Function of pH.

| pH | Ni | % Ni ret | Pb | % Pb ret | Zn | % Zn ret |
|---|---|---|---|---|---|---|
| 1.04 | 9.67 | 0.00 | 29.48 | 9.38 | 5.38 | 47.58 |
| 2.06 | 9.21 | 0.02 | 28.09 | 13.65 | 5.21 | 49.26 |
| 2.95 | 9.57 | 0.00 | 29.48 | 9.385 | 5.42 | 47.23 |
| 4.05 | 6.43 | 30.22 | 24.57 | 24.47 | 5.28 | 48.60 |
| 5.05 | 1.20 | 87.01 | 11.17 | 65.66 | 4.683 | 54.47 |
| 6.05 | 0.23 | 97.56 | 1.19 | 96.34 | 0.98 | 90.51 |
| 7.10 | 0.17 | 98.13 | 0.16 | 99.50 | 0.17 | 98.31 |

Example 12

Load Capacity of PEI-Diol

The loading capacity of PEI-Diol was studied at neutral pH. A stock solution containing 20% PEI-Diol was prepared. A solution of 0.5 M $NaNO_3$ was also prepared. A set of solutions were prepared, each solution containing 0.100 mM of one of the following metal ions: $Cd^{2+}$, $Cu^{2+}$, $Eu^{3+}$, $Ni^{2+}$, $Pb^{2+}$, and $Zn^{2+}$. A sample for each of the metal ions was prepared in a 50.00 mL volumetric flask. 0.05 g of the PEI-Diol stock solution and 10.00 mL of the 0.5 M $NaNO_3$ solution were added to each of eight flasks. An amount of the 0.100 mM metal ion solution was added to each flask as follows: flask 2, 11.24 mL of $Cd^{2+}$, flask 3, 6.36 mL of $Cu^{2+}$; flask 4, 15.20 mL of $Eu^{3+}$; flask 6, 5.87 mL of $Ni^{2+}$; flask 7, 20.72 mL of $Pb^{2+}$; and flask 8, 6.54 mL of $Zn^{2+}$. The pH of each solution was adjusted to 7.0 by the drop-wise addition of NaOH or $HNO_3$ as necessary. The flasks were filled to the 50.00 mL mark by deionized water.

The samples were then mixed and transferred to centricon tube with an ultrafiltration membrane. The tubes were centrifuged for about 30 minutes. The permeate was analyzed with ICP and the results of the ICP were used to calculated the percent of the metal retained for each metal ion. The results of this study are shown in Table 9.

TABLE 9

Binding of Metal Ions by PEI-Diol at Neutral pH.

| Metal Ion | Initial Concentration ppm | Concentration in Permeate ppm | % Metal Retained |
|---|---|---|---|
| Cd | 224.8 | 152.3 | 32.25 |
| Cu | 127.2 | 19.41 | 84.74 |
| Eu | 304.0 | 114.5 | 62.34 |
| Ni | 117.4 | 87.46 | 25.50 |

TABLE 9-continued

Binding of Metal Ions by PEI-Diol at Neutral pH.

| Metal Ion | Initial Concentration ppm | Concentration in Permeate ppm | % Metal Retained |
|---|---|---|---|
| Pb | 414.4 | 212.3 | 48.77 |
| Zn | 130.8 | 93.7 | 28.36 |

SUMMARY

In summary, functionalized polymers for binding dissolved molecules within aqueous solutions are presented. The functionalized polymer can be water soluble and used with methods of Polymer Filtration (water-soluble solute-binding polymers with ultrafiltration) or can be crosslinked and made insoluble and used for coatings, beads, and the like. The functionalized polymers form a complex with targeted solutes and thereby enable the solute to be selectively removed from the solution.

We claim:

1. A functionalized polymer for binding a solute or a suite of solutes dissolved in a solution comprising:
   a polymeric backbone, wherein the polymeric backbone is selected from the group consisting of polyvinylamine, polyallylamine, polyacrylamide, polyethylenimine, polyacrylic acid, polymethacrylic acid, polyvinylalcohol, polyvinylacetate, and polypyrrol; and
   one or more functional groups covalently linked to the polymeric backbone, the one or more functional groups selected to bind to the solute or a suite of solutes, the one or more functional groups selected from the group consisting of a monool derivative, a diol derivative, a triol derivative, a tetraol derivative, a glucarone derivative, a thiol derivative, a dithiol derivative, an alpha-hydroxycarboxylic acid derivative, a tartrate derivative, a calixarene derivative, a polypeptide derivative, bisphosphonic acid derivatives, biscarboxylic acid derivatives and bisamide derivatives, bisester derivatives, a monoester derivative, a monoamide derivative, a mixed phosphonic acid/carboxylic acid derivative, an alkylpyridinium derivative, a cyclodextran derivative, an antibody, a Fab fragment of an antibody, a F(ab)$_2$ of an antibody, an antigen, a cavity of selected size that hosts the solute selectively, a cage-shaped host, guest-host groups, and affinity groups, wherein the functionalized polymer binds to a neutral metalloid or non-metallic solute or a suite of metalloid or non-metallic solutes by one of inclusion and ester or thioester formation.

2. The functionalized polymer of claim 1, wherein the polymeric backbone is polyethylenimine, and wherein the one or more functional groups is selected from the group consisting of a monool derivative, a diol derivative, and a tartrate derivative.

3. The functionalized polymer of claim 2, wherein the diol derivative is tartrate.

4. The functionalized polymer of claim 3, wherein the tartrate is covalently linked to the polymeric backbone to form a cyclic tartrate imide.

5. The functionalized polymer of claim 3, wherein the tartrate is covalently linked to the 5 polymeric backbone to form an open monoester, which can be converted to a carboxylic acid.

6. The functionalized polymer of claim 3, wherein the tartrate is covalently linked to the polymeric backbone to form a diamide attached to two different nitrogen atoms of the polymeric backbone.

7. The functionalized polymer of claim 1, wherein the diol derivative is glycidol.

8. The functionalized polymer of claim 1, wherein the functionalized polymer is crosslinked thereby rendering the, functionalized polymer insoluble in water.

9. The functionalized polymer of claim 1, wherein the functionalized polymer is water-soluble.

10. The functionalized polymer of claim 9, wherein the functionalized polymer is purified to have polymer molecule sizes capable of being retained by a membrane with a molecular weight cutoff value of a first pre-selected level and essentially free of polymer molecule sizes capable of passing through a membrane with a molecular weight cutoff value of a second pre-selected level the second pre-selected level being smaller than the first pre-selected level.

11. The functionalized polymer of claim 10, wherein the functionalized polymer has a molecular weight in the range from about 1,000 MW to about 1,000,000 MW.

12. The functionalized polymer of claim 10, wherein the functionalized polymer has a molecular weight in the range from about 10,000 MW to about 100,000 MW.

13. The functionalized polymer of claim 1, wherein the functionalized polymer is represented by the formula X—R wherein "X" is a synthetic polymer selected from the group consisting of polyethylenimine, polyvinylamine, polyallylamine, polypropylamine polyacrylamide, polycthylenimine, polyacrylic avid, polymethacrylic acid, polyvinylalcohol, polyvinylacerate, or polypyrrol, and "R" is a functional group selected from the group consisting of a monool derivative, a diol derivative, a tetraol derivative, a triol derivative, an aiphabydroxycarboxylate derivative, a glucarone derivative, and a dithiol derivative.

14. The functionalized polymer of claim 13, wherein the polymer is water soluble.

15. The functionalized polymer of claim 14, wherein the functionalized polymer is purified to have polymer molecule sizes capable of being retained by a membrane with a molecular weight cutoff value of a first pre-selected level and essentially free of polymer molecule sizes capable of passing through a membrane with a molecular weight cutoff value of a second pre-selected level the second pre-selected level being smaller than the first pre-selected level.

16. The functionalized polymer of claim 14, wherein the functionalized polymer has a molecular weight in the range from about 1,000 MW to about 1,000,000 MW.

17. The functionalized polymer of claim 14, wherein the functionalized polymer has a molecular weight in the range from about 10,000 MW to about 100,000 MW.

18. The functionalized polymer of claim 13, wherein the metalloid or non-metallic solute or suite of metalloid or non-metallic solutes is selected from the group consisting of species of arsenic, boron, silicon, and antimony.

19. The functionalized polymer of claim 1, wherein the functionalized polymer is represented by the formula X—R wherein "X" is a synthetic polymer selected from the group consisting of polyethylenimine, polyvinylamine, polyallylamine, polypropylamine, polyacrylamide, polyothylenimine, polyacrylic acid, polymethacrylic acid, polyvinylalcohol, polyvinylacetate, or polypyrrol, and "R" is a functional group selected from the group consisting of a thoil derivative, a tartrate derivative, a calixarene derivative, a polypeptide derivative, bisphosphonic acid derivatives, biscarboxylic acid derivatives and bisamide derivatives, bisester derivatives, a monoester derivative, a monoamide derivative, a mixed phosphonic acid/carboxylic acid derivative, an alkylpyridinium derivative, a cyclodextran derivative, an antibody, a Fab fragment of an antibody, a F(ab)$_2$ of an antibody, an antigen, a cavity of selected size that hosts the solute selectively, a cage-shaped host, guest-host groups, and affinity groups.

20. The functionalized polymer of claim 19, wherein the polymer is water soluble.

21. The functionalized polymer of claim 20, wherein the functionalized polymer is purified to have polymer molecule sizes capable of being retained by a membrane with a molecular weight cutoff value of a first pre-selected level and essentially free of polymer molecule sizes capable of passing through a membrane with a molecular weight cutoff value of a second pre-selected level the second pre-selected level being smaller than the first pre-selected level.

22. The functionalized polymer of claim 20, wherein the functionalized polymer has a molecular weight in the range from about 1,000 MW to about 1,000,000 MW.

23. The functionalized polymer of claim 20, wherein the functionalized polymer has a molecular weight in the range from about 10,000 MW to about 100,000 MW.

24. The functionalized polymer of claim 19, wherein the metalloid or non-metallic solute or suite of metalloid or non-metallic solutes is selected from the group consisting of species of arsenic, boron, silicon, and antimony.

25. The functionalized polymer of claim 1, wherein the metalloid or non-metallic solutes or suite of metalloid or non-metallic solutes is selected from the group consisting of arsenic, boron, silicon, iodine, and antimony.

26. A functionalized synthetic polymer for binding a solute or a suite of solutes dissolved in a solution comprising:
   a water-soluble backbone polymer selected from the group consisting of polyethylenimine, polyvinylamine, polyallylamine, polypropylamine polyacrylamide, polyethylenimine, polyacrylic acid, polymethacrylic acid, polyvinylalcohol, polyvinylacetate, or polypyrrol; and
   one or more functional groups covalently linked to the polymeric backbone, the one or more functional groups selected to bind to the solute or a suite of solutes, the one or more functional groups selected from the group consisting of a monool derivative, a diol derivative, and a thiol derivative, a tartrate derivative, the functionalized polymer being purified to have polymer molecule sizes capable of being retained by a membrane with a molecular weight cutoff value of a first pre-selected level and essentially flee of polymer molecule sizes capable of passing through a membrane with a molecular weight cutoff value of a second pre-selected level the second pre-selected level being smaller than the first pre-selected level, wherein the functionalized polymer binds to a neutral metalloid or non-metallic solute or a suite of metalloid or non-metallic solutes by one of inclusion and ester or thioester formation.

27. The functionalized polymer of claim 26, wherein the diol derivative is tartrate.

28. The functionalized polymer of claim 27, wherein the tartrate is covalently linked to the polymeric backbone to form a cyclic tartrate imide.

29. The functionalized polymer of claim 27, wherein the tartrate is covalently linked to the polymeric backbone to form an open monoester.

30. The functionalized polymer of claim 27, wherein the tartrate is covalently linked to the polymeric backbone to form a diamide attached to two different nitrogen atoms of the polymeric 10 backbone.

31. The functionalized polymer of claim 26, wherein the functionalized polymer has a molecular weight in the range from about 1,000 MW to about 1,000,000 MW.

32. The functionalized polymer of claim 26, wherein the functionalized polymer has a molecular weight in the range from about 10,000 MW to about 100,000 MW.

33. The functionalized polymer of claim 32, wherein the metalloid or non-metallic solute or suite of non-metallic solutes is selected from the group consisting of species of arsenic, boron, silicon, and antimony.

34. The functionalized polymer of claim 26, wherein the solute or suite of solutes is selected from the group consisting of arsenic, barium 1 boron, silicon, iodine, and antimony.

35. The functionalized synthetic polymer of claim 26, wherein the functionalized polymer is represented by the formula X—R wherein "X" is a polymer selected from the group consisting of polyethylenimine, polyvinylamine, polyallylamine, polypropylamine polyacrylamide, polyethylenimine, polyacrylic acid, polymethacrylic acid, polyvinylalcohol, polyvinylacetate, or polypyrrol, and "K" is a functional group selected from the group consisting of a monool derivative, a diol derivative, and a thiol derivative, a tartrate derivative.

36. A functionalized polymer for binding a solute or a suite of solutes dissolved in a solution, the functionalized polymer comprising a molecule of the formula:

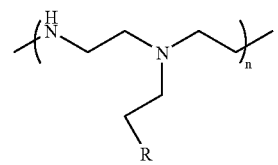

wherein n is an integer between about 12 and about 12,000 and R is Nh$_2$ except at one or more positions within the polymer where R is a functional group independently selected from the group consisting of a monool derivative, a dial derivative, and a thiol derivative, a tartrate derivative, wherein the functionalized polymer binds to a neutral metalloid or non-metallic solute or a suite of metalloid or non-metallic solutes by one of inclusion and ester or thioester formation.

37. The functionalized polymer of claim 36, wherein the functionalized polymer is crosslinked thereby rendering the functionalized polymer insoluble in water.

38. The functionalized polymer of claim 36, wherein the functionalized polymer is water-soluble.

39. The functionalized polymer of claim 38, wherein the functionalized polymer is purified to 20 have polymer molecule sizes capable of being retained by a membrane with a molecular weight cutoff value of a first pre-selected level and essentially free of polymer molecule sizes capable of passing through a membrane with a molecular weight cutoff value of a second pre-selected level the second pre-selected level being smaller than the first pre-selected level.

40. The functionalized polymer of claim 39, wherein the functionalized polymer has a molecular weight in the range from about 1,000 MW to about 1,000,000 MW.

41. The functionalized polymer of claim 39, wherein the functionalized polymer has a molecular weight in the range from about 10,000 MW to about 100,000 MW.

42. The functionalized polymer of claim 39, wherein the metalloid or non-metallic solute or suite of metalloid or non-metallic salutes is selected from the group consisting of species of arsenic, boron, silicon, and antimony.

43. The functionalized polymer of claim 36, wherein the solute or suite of solutes is selected from the group consisting of arsenic, boron, silicon, iodine, and antimony.

* * * * *